United States Patent
Bernard et al.

(10) Patent No.: US 6,914,405 B2
(45) Date of Patent: Jul. 5, 2005

(54) INTERFACE COMPONENT FOR A POSITIONING SYSTEM AND METHOD FOR DESIGNING AN INTERFACE COMPONENT

(75) Inventors: Marc Bernard, Louisville, CO (US); Eduardo Cocoa, Thornton, CO (US)

(73) Assignee: MicroE Systems Corp., Natick, MA (US)

( * ) Notice: Subject to any disclaimer, the term of this patent is extended or adjusted under 35 U.S.C. 154(b) by 292 days.

(21) Appl. No.: 09/955,415

(22) Filed: Sep. 18, 2001

(65) Prior Publication Data

US 2002/0053251 A1 May 9, 2002

Related U.S. Application Data

(60) Provisional application No. 60/233,799, filed on Sep. 19, 2000.

(51) Int. Cl.[7] .................................................. G05B 5/01
(52) U.S. Cl. .......................................... 318/611; 360/75
(58) Field of Search ........................... 360/77.01–77.05, 360/75; 74/96; 318/561, 609–611, 621

(56) References Cited

U.S. PATENT DOCUMENTS

| | | | |
|---|---|---|---|
| 4,531,167 A | 7/1985 | Berger | 360/77 |
| 4,639,863 A | 1/1987 | Harrison et al. | 364/200 |
| 4,676,645 A | 6/1987 | Taniguchi et al. | 356/356 |
| 4,703,176 A | 10/1987 | Hahn et al. | 250/231 |
| 4,776,701 A | 10/1988 | Pettigrew | 356/356 |
| 4,794,586 A | 12/1988 | Korth | 369/215 |
| 4,797,754 A | 1/1989 | Sugano et al. | 360/48 |
| 4,815,850 A | 3/1989 | Kanayama et al. | 356/349 |
| 4,831,470 A | 5/1989 | Brunnett et al. | 360/75 |
| 4,870,635 A | 9/1989 | Block et al. | 369/215 |
| 5,079,755 A | 1/1992 | Hangai et al. | 369/44.11 |
| 5,098,190 A | 3/1992 | Wijntjes et al. | 356/356 |
| 5,108,184 A | 4/1992 | Brown et al. | 356/363 |
| 5,121,371 A | 6/1992 | Farnsworth et al. | 369/44.26 |
| 5,159,408 A | 10/1992 | Waldenmaier et al. | 356/357 |
| 5,164,863 A | 11/1992 | Janz | 360/57 |
| 5,179,485 A | 1/1993 | Tamayama | 360/106 |
| 5,193,034 A | 3/1993 | Tsuyoshi et al. | 360/51 |
| 5,196,970 A | 3/1993 | Seko et al. | 360/77.03 |
| 5,227,625 A | 7/1993 | Hetzler | 250/231.13 |
| 5,227,930 A | 7/1993 | Thanos et al. | 360/78.04 |
| 5,268,801 A | 12/1993 | Hazel et al. | 360/77.03 |
| 5,315,372 A | 5/1994 | Tsai | 356/358 |
| 5,319,509 A | 6/1994 | Michelson et al. | 360/77.03 |
| 5,339,204 A | 8/1994 | James et al. | 360/51 |
| 5,459,921 A * | 10/1995 | Hudson et al. | 29/603.03 |
| 5,726,879 A * | 3/1998 | Sato | 700/56 |
| 6,122,139 A * | 9/2000 | Sri-Jayantha et al. | 360/97.02 |

* cited by examiner

Primary Examiner—Jeffrey W. Donels
(74) Attorney, Agent, or Firm—James F. Thompson, Esq.; Chapin & Huang, LLC

(57) ABSTRACT

An interface component for a positioning system. The interface component includes a positioning arm having a first end and a second end, the first end being positionable against an object to be positioned and the second end being attachable to an actuator arm of the positioning system, and a damping element operably connected in parallel with the positioning arm.

18 Claims, 16 Drawing Sheets

POSITIONER AND HDA RESPONSE WITH BANG-BANG SEEK PROFILE WITH STIFF PIN

ACTURATOR AND POSITIONER RESPONSE FOR STANDARD BANG-BANG SEEK WITH SOFT MATERIAL

RESPONSE FOR TORQUE DISTURBANCE AT ACTUATOR WITH ENG PIN

POSITIONER AND ACTUATOR RESPONSE WITH ENGINEERED PIN

INTERFACE COMPONENT FOR A POSITIONING SYSTEM AND METHOD FOR DESIGNING AN INTERFACE COMPONENT

RELATED APPLICATION

The present application claims priority to Provisional Application Ser. No. 60/233,799 filed on Sep. 19, 2000, and entitled "High Accuracy Push Pin," which is expressly incorporated herein by reference.

FIELD

The present invention relates generally to a mechanical interface component and more specifically to an interface component for use in a positioning system.

BACKGROUND

FIG. 1 shows a perspective view of a prior art rotational positioning system 10. As shown, system 10 includes a positioning component 20. As will be discussed in greater detail below, in operation positioning component 20 is used to control the position of a positioned component 30. Rotational positioning systems such as system 10 illustrated in FIG. 1 are well known in the art and may be used, for example, to control the location of read/write heads of hard disk data storage systems during servo track writing.

In system 10, positioning component 20 includes a rotationally mounted arm 21, an actuator 23, and a position sensor 25. Arm 21 is rotationally mounted so that it may rotate in the directions indicated by arrow A—A in FIG. 1. Actuator 23, which may be implemented, for example, using a voice coil motor, is coupled to arm 21 so as to control the rotational orientation of arm 21. Sensor 25, which may be implemented, for example, using an optical sensor, senses the rotational orientation of arm 21. Interface component 50 is disposed at one end of arm 21 and is designed to contact positioned component 30. Interface component 50 is generally implemented as a relatively rigid rod or pin.

In operation, system 10 controls the position of positioned component 30 by using interface component 50 to push or follow positioned component 30 to desired locations. System 10 uses sensor 25 to sense the position of interface component 50 (i.e., by sensing the position of arm 21 to which component 50 is attached) and uses actuator 23 to move interface component 50 to desired locations.

In FIG. 1, the positioned component 30 is shown as including an arm 33, a bearing structure 35, a biasing element 37, and a target feature 31. Arm 33 is rotationally mounted so that it may pivot about a point defined by bearing structure 35 in the directions illustrated by arrow A—A. Target feature 31 is disposed at one end of arm 33. In FIG. 1, target feature 31 represents the read/write heads of a hard disk data storage system. Biasing element 37 operates to bias arm 33 so that arm 33 is biased in the direction of the interface component 50.

In operation, system 10 controls the location of target feature 31 by using interface component 50 to push arm 33 to desired locations. Biasing element 37 insures that arm 33 remains in intimate contact with interface component 50.

Ideally, the positioned component 30 always remains in contact with the positioning component 20 so that the location of the target feature 31 may always be controlled by controlling the location of interface component 50. However, one problem associated with prior art positioning systems such as system 10 is that, at high operating frequencies, including those above a resonant frequency, the response of the positioned component may become decoupled from the input of the positioning component. In the case of system 10 shown in FIG. 1, rapid movements of positioned component 20 may cause arm 33 to become decoupled above the natural frequency of the system from interface component 50. In addition, the positioned component 30 may not settle acceptably after movement of positioning component 20, but may instead oscillate about a desired position for an undesirable period of time. Also, in high frequency systems in which the desired level of control is measured in small units, such as nanometers, the inertial and spring like qualities of components of the positioning system may adversely affect system performance. These qualities of the system may exacerbate (1) the decoupling of the positioned component from the positioning component when the system is operating at high frequencies and (2) the oscillation of the positioned component about a desired position.

FIG. 2 illustrates a prior art approach for suppressing oscillation (or ringing) of the target feature in rotational positioning systems. More specifically, FIG. 2 shows a prior art rotational system 10', which is substantially identical to system 10 (shown in FIG. 1), except that the interface component 50 of system 10' additionally includes a pad 55. Pad 55 is fabricated from a dampening material and is attached to the end of interface component 50. Pad 55 is disposed in the system 10' so that it, rather than interface component 50, makes contact with positioned component 30. The pad 55, therefore, is connected in "series" between the interface component 50 and the positioned component 30 so that the pad 55 itself contacts the positioned component 30. To review, in system 10 (FIG. 1), the relatively rigid interface component 10 directly contacts positioned component 30, and this contact causes positioned component 30 to move in response to any movement of interface component 50. In contrast to system 10, in system 10', the pad 55 rather than the interface component 50 contacts the positioned component 30. Although motion of interface component 50 in system 10' still causes movement of positioned component 30, the contact between components 50 and 30 is buffered through pad 55.

Use of pad 55 in system 10' advantageously reduces oscillation of the target feature 31. However, use of pad 55 in system 10' also disadvantageously reduces the effective interconnecting spring stiffness between the positioning component 20 and the positioned component 30. This reduction in the effective interconnecting spring stiffness decreases the frequency at which the location of the positioned component 30 will decouple from the location of the positioning component 20. In addition, the properties of the pad 55 may change over time or operational conditions, e.g., with temperature changes, or with stroke range. As a result, the position of the target feature 31 may become indeterminate as the properties of the pad 55 change.

FIG. 3 illustrates a prior art linear positioning system 10a in which a relatively rigid interface component 50a of the positioned component 20a directly contacts the positioned component 30a. FIG. 4 illustrates a prior art linear positioning system 10a' in which a dampening pad 55a' is disposed between interface component 50 and the positioned component 30. It will be appreciated that systems 10a (FIG. 3) and 10a' (FIG. 4) suffer from the same deficiencies discussed above in connection with systems 10 (FIG. 1) and 10' (FIG. 2), respectively. For completeness, a brief description of system 10a is provided below.

In system 10a, the positioned component 20a includes a translational arm 21a, an actuator 23a, and a position sensor 25a. Arm 21a is translationally disposed so that it may translate in the directions indicated by arrow B—B in FIG. 3. Actuator 23a is coupled to arm 21a so as to control the translation of arm 21a. Sensor 25a senses the translational movement of arm 21a. Interface component 50a, which may be implemented as a relatively rigid rod or pin, is disposed at one end of arm 21a and is designed to contact, or attach to, positioned component 30a.

In operation, the system 10a of FIG. 3 controls the position of positioned component 30a by using interface component 50a to push or follow positioned component 30a to desired locations. System 10a uses sensor 25a to sense the position of interface component 50a and uses actuator 23a to move interface component 50a to desired locations.

In FIG. 3, the positioned component 30a is shown as including an arm 33a, a bearing structure 35a, a biasing element 37a, and a target feature 31a. Arm 33a is translationally attached so that it may slide along bearing structure 35a in the directions illustrated by arrow B—B. Target feature 31a is disposed at one end of arm 33a. Biasing element 37a operates to bias arm 33a so that target feature 31a is biased towards a home position.

FIG. 4 shows a prior art approach of suppressing oscillation (or ringing) of the target feature in a translational positioning system. More specifically, FIG. 4 shows a prior art translational system 10a', which is substantially identical to system 10a (shown in FIG. 3), except that the interface component 50a of system 10a' additionally includes a pad 55a'. The pad 55a' is similar to the pad 55 of FIG. 2, and is disposed in the system 10a' so that it, rather than interface component 50a, makes contact with positioned component 30. Much like the use of pad 55 in rotational positioning system 10' of FIG. 2, use of the pad 55a' in the translational positioning system 10a' of FIG. 4 reduces oscillation of the target feature 31a. However, use of pad 55a' in system 10a' also disadvantageously reduces the effective interconnecting spring stiffness between the positioning component 20a and the positioned component 30a. Thus, the system 10a' is subject to the same problems associated with the system 10' of FIG. 2.

Accordingly, a need exists for a method and system for reducing oscillation of a positioned component in a positioning system while enabling the system to function at sufficiently high frequencies of operation.

SUMMARY

One embodiment of the invention relates to an interface component for a positioning system. In this embodiment, the interface component includes a positioning arm and a damping element connected to the positioning arm. The positioning arm has a first end and a second end, with the first end being positionable against an object to be positioned, such as the positioned component, and the second end being attachable to an actuator arm of the positioning system. The damping element, which can fit around the positioning arm, is connected in parallel with the positioning arm so that the first end of the positioning arm extends beyond the damping element. In this embodiment, the first end of the positioning arm is directly positionable against the object to be positioned without the damping element fitting between the first end and the object to be positioned when the interface component is in use. The damping element can therefore provide for damping of oscillation without significantly reducing the stiffness of the interface component.

Another embodiment of the invention is also an interface component. In this embodiment, the interface component includes a support structure, a positioning arm, and a damping element. The support structure, in this embodiment, can have a cup section and a base region with a bore therein. The positioning arm has a first end, a second end, and defines a generally central longitudinal axis. In this embodiment, the second end of the positioning arm is attached within the bore in the base region of the support structure. The damping element, in turn, at least partially surrounds the positioning arm so that the first end of the positioning arm extends longitudinally beyond the damping element. In addition, the damping element fits within the cup section of the support structure. In this embodiment, the first end of the positioning arm can have a rigid surface that contacts an object to be positioned when the interface component is in use. The support structure can be attached to an actuator arm of the positioning system when in use.

Another embodiment of the invention is a method for damping in a positioning system. In this embodiment, the method includes positioning a first end of a positioning arm against a positioned component of the positioning system, affixing a second end of the positioning arm to a positioning component of the positioning system, and attaching a damping element in parallel with the positioning arm between the positioned component and the positioning component.

Yet another embodiment of the invention is a method for designing an interface component for use in a system between a positioned component and a positioning component. In this embodiment, the method includes determining mechanical properties of the system independent of the interface component. These mechanical properties, which can be determined experimentally, include the spring constant of the system aside from the interface component. In this embodiment, the method can then involve determining an effective interconnecting spring constant for the system (including the interface component) using a desired frequency of operation for the system. The method then involves calculating an effective spring constant for the interface component using the effective interconnecting spring constant and the mechanical properties of the system, such as the spring constant for the system independent of the interface component.

DETAILED DESCRIPTION

Figure 6:
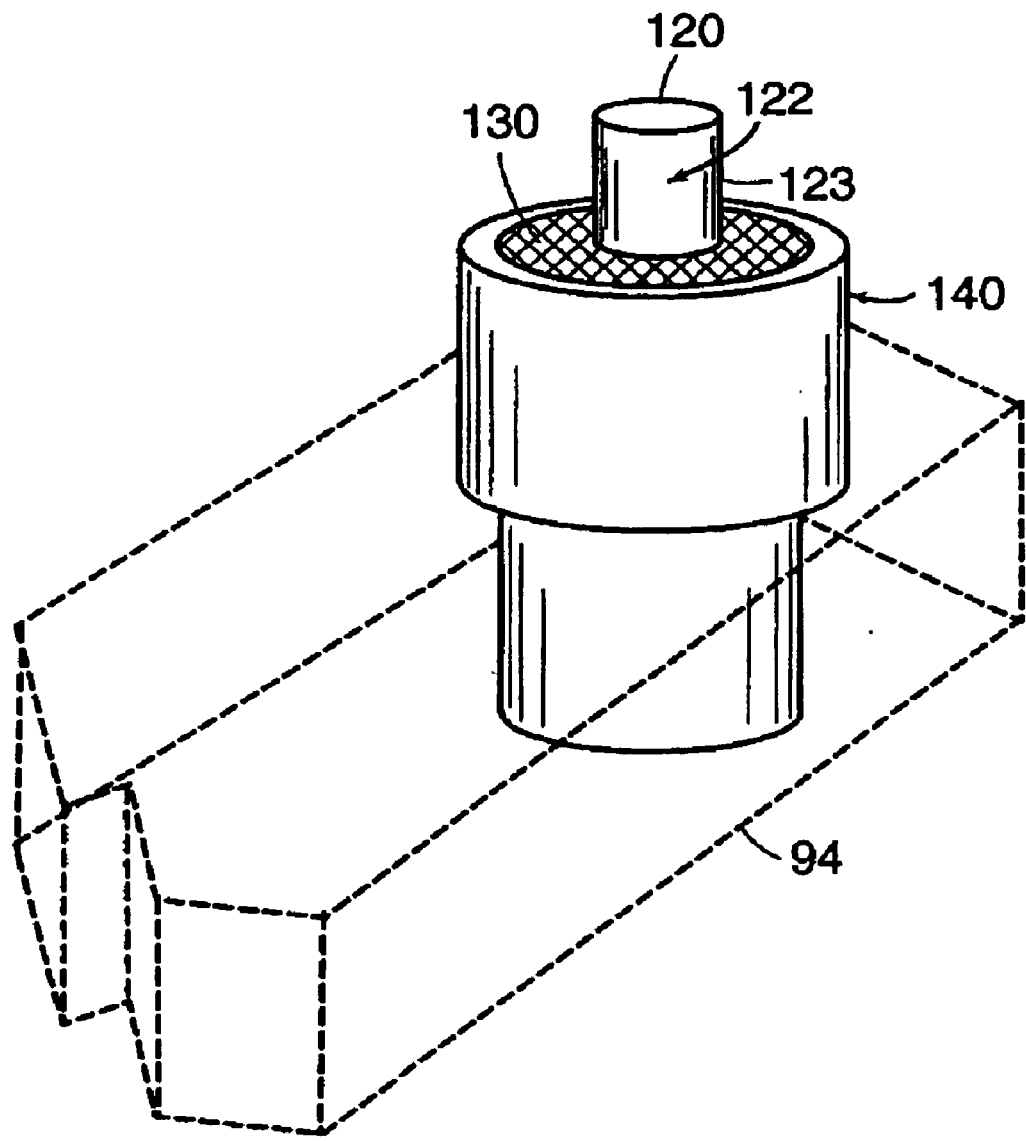
FIG. 6 is a perspective view of the embodiment of the interface component of FIG. 5 in assembled form.
Figure 6A:
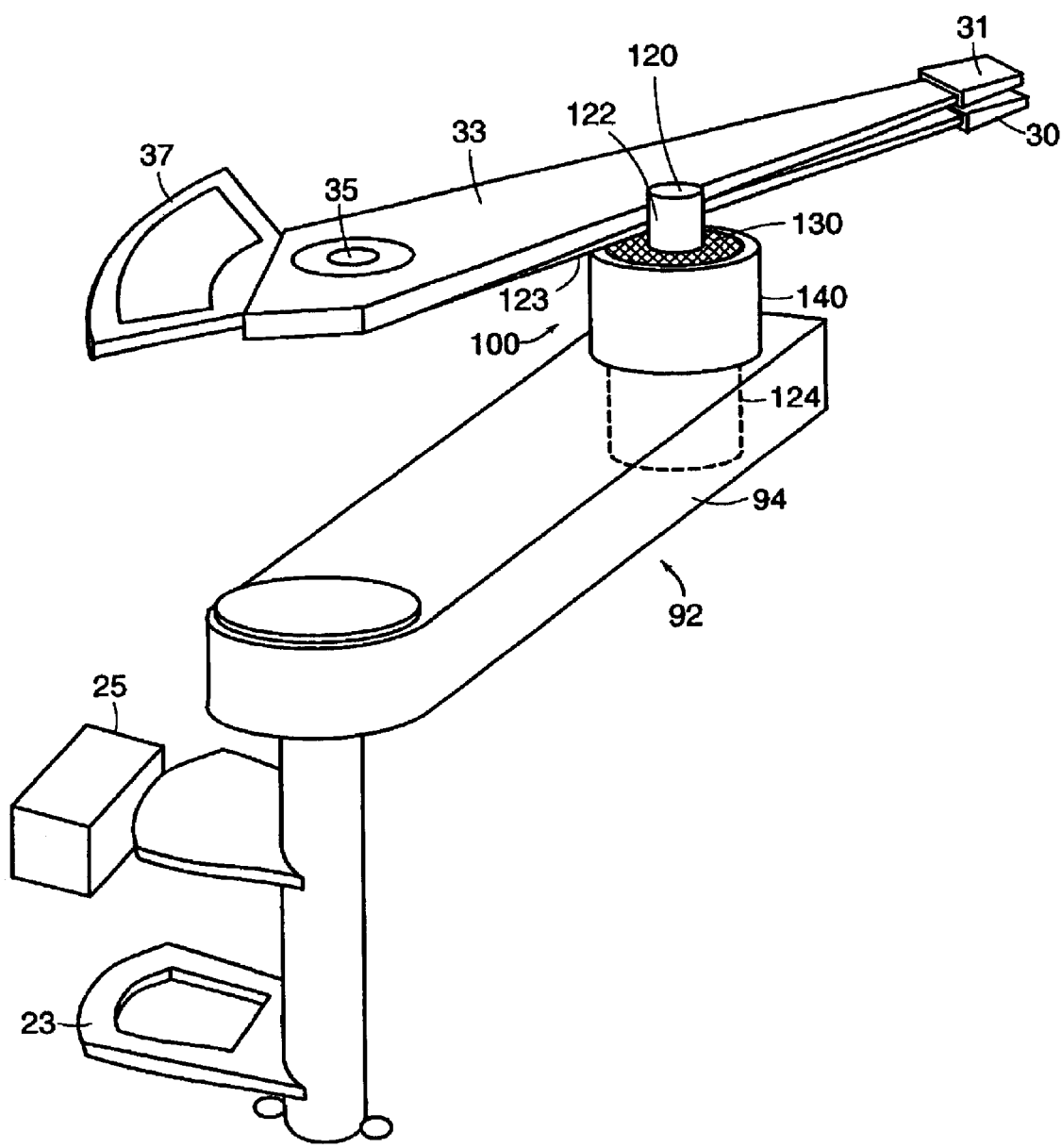
FIG. 6a is a perspective view of the embodiment of the interface component of FIG. 5 in use in a rotational positioning system.

FIG. 6a shows a rotational positioning system 90 constructed according to an embodiment of the invention. As with prior art rotational positioning system 10 (FIG. 1), system 90 includes a positioning component 92, which, in operation, controls the location of positioned component 30. Generally, the positioning component 92 and the positioned component 30 may be the same as the in the prior art rotational positioning system 10 of FIG. 1. Positioning component 92, for example, includes a rotationally mounted arm 94, an actuator 23, and a position sensor 25. Positioned component 30 includes an arm 33, a bearing structure 35, a biasing element 37, and a target feature 31. The rotational positioning system 90 includes an improved interface component 100. As discussed in greater detail below, inclusion of an improved interface component 100 in system 90 advantageously improves the performance of system 90 by (1) reducing oscillation of the target feature 31 after a change in position and by (2) allowing the system 90 to function at sufficiently high frequencies without decoupling of the positioned component from the positioning component.

Figure 5:
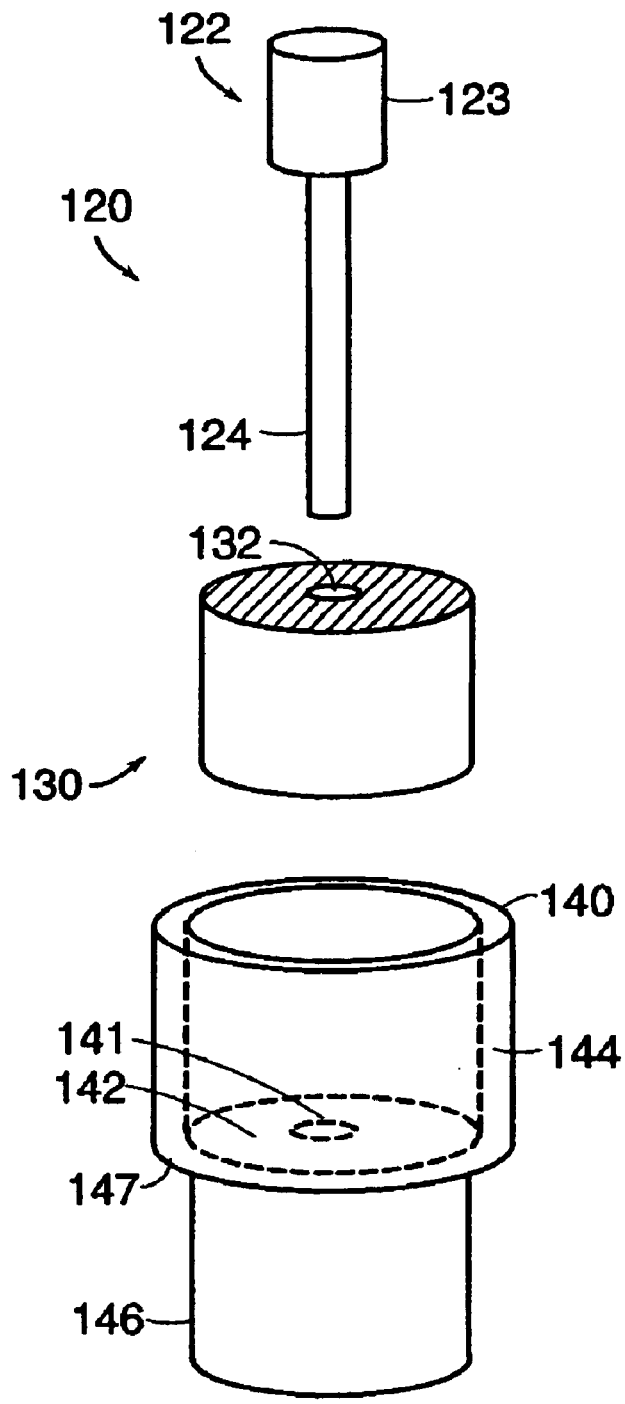
FIG. 5 is a perspective view of one embodiment of the interface component of the invention in unassembled form.
Figure 7:
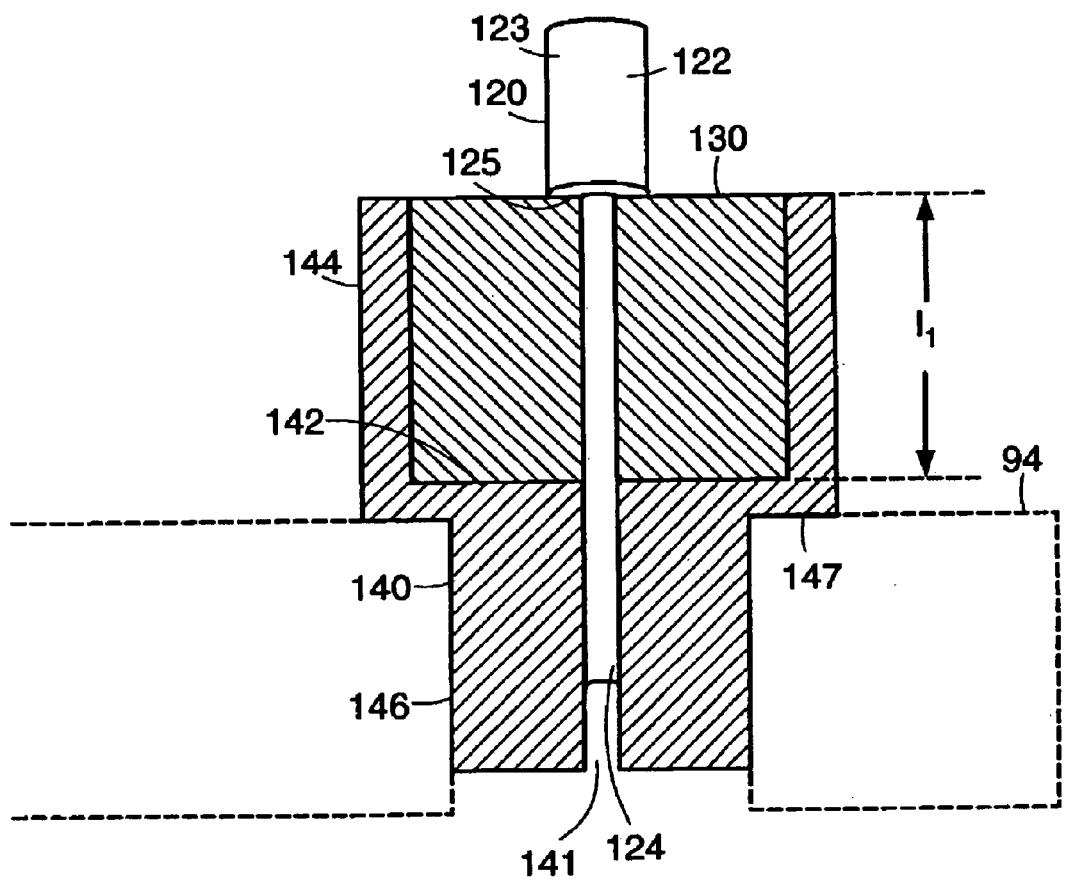
FIG. 7 is a side sectional view of the interface component of FIG. 5.
Figure 8:
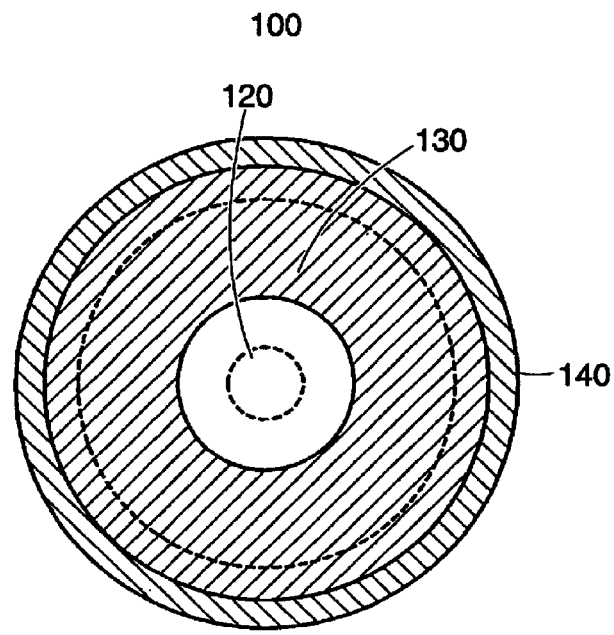
FIG. 8 is a top view of the interface component of FIG. 5.

FIGS. 5–8 depict one preferred embodiment of interface component 100. As shown in FIG. 5, interface component 100 includes a positioning arm 120, a damping element 130, and a support structure 140. The positioning arm 120, damping element 130, and support structure 140 may fit together as depicted in FIG. 7. The damping element 130 generally surrounds at least a portion of the positioning arm 120, although the damping element 130 need not entirely surround the positioning arm 120. FIG. 7, for instance, depicts the positioning arm 120 fitting partially within a bore in the damping element 130 and partially within a bore in the support structure 140. The damping element 130 may, in turn, fit within a cup of the support structure 140, as shown in FIG. 7.

The positioning arm 120 may have varying shapes in different embodiments of the invention. In the embodiment depicted in FIGS. 5–8, the positioning arm 120 is cylindrical in shape with a generally central longitudinal axis. It should be noted, however, that the positioning arm 120 need not have a circular cross-section, but may instead be shaped in any manner, including, for example, an elongate structure with a square, rectangular, or elliptical cross-section. In addition, the positioning arm 120 need not be symmetric about a generally central longitudinal axis, but may instead be of an irregular shape. The positioning arm 120 depicted in the embodiments of FIGS. 5–8 is a cylindrically shaped pin.

The positioning arm 120 of the interface component 100 has a first end 122 and a second end 124. The first end 122 of the positioning arm 120 contains a rigid contact surface 123, which generally serves as the load-bearing surface of the interface component 100 against the support arm 33 when in use. In FIGS. 5–8, the first end 122 having the rigid contact surface 123 has a larger diameter than the rest of the length of the cylindrical positioning arm 120.

In one embodiment, the positioning arm 120 may be made from a single rod or pin, although in other embodiments the first end 122 may be a separate piece from the rest of the positioning arm 120. In an embodiment in which the positioning arm 120 is made from a single rod, a rod may be turned on a lathe in order to produce a length with a decreased diameter for an intended spring constant. In these embodiments, the first end 122 having the rigid contact surface 123 may simply be an end of a continuously constructed positioning arm 120, which either may or may not be machined or constructed to have differing dimensions from the remaining length of the positioning arm 120. In an embodiment in which the positioning arm is made from two pieces, the rigid contact surface 123 may be a separate component from the positioning arm 120 that is rigidly attached to the first end 122 of the positioning arm 120.

The positioning arm 120 of the interface component 100 may be made from a variety of generally rigid or stiff materials known to those skilled in the art. Such materials include metals and metallic alloys, including steel and aluminum, and ceramic materials.

In operation, the positioning arm 120 of the interface component 100 translates the motion of the positioning component 92 to the positioned component 30. Throughout this specification, therefore, the term "positioning arm" will be used to refer to a portion of the interface component 100 that is the primary link between a positioned component 30 and a positioning component 92 in a positioning system.

The support structure 140 can be a cup-shaped structure in which the positioning arm 120 and the damping element 130 may be disposed. Referring to FIGS. 5 and 7, the support structure 140 contains a hollow upper portion 144 and a base region 146. The hollow upper portion 144 forms a cup in which the damping element 130 may be disposed. The inside of the upper portion 144 of the support structure 140 can contain a surface 142 upon which the damping element 130 rests. This surface 142 can be flat or irregularly shaped. The support structure 140 can be generally cylindrical in shape with a longitudinal axis extending therethrough. The shape and dimensions of the support structure 140, however, may vary in different embodiments of the invention.

The base region 146 of the support structure 140 may be of a smaller diameter than the upper portion 144 of the support structure 140. This difference in diameter forms a shoulder region 147, which may aid in attaching the support structure 140 to the arm 94 of the positioning component 92, as discussed in more detail below. The base region 146 contains a hole 141 in which the positioning arm 120 may fit. This hole 141 in the base region 146 may be slightly smaller than the diameter of the second end 124 of the positioning arm 120. The second end 124 of the positioning arm 120 may be snugly inserted into the hole 141 in the support structure 140 using a shrink fit technique.

The support structure 140 can be made from any suitable, rigid material, such as a metal or metallic alloy. In addition, the support structure 140 may be formed from one continuous piece of material or from two or more pieces of material.

The damping element 130 of the interface component 100, as depicted in the embodiments of FIGS. 5–8, generally surrounds at least a portion of the positioning arm 120 and serves to absorb shock or vibrating forces from the positioning arm 120. Throughout this specification, the term "damping element" will be used to refer to a portion of the interface component 100 that is made from a material that is sufficiently energy-absorbing to absorb energy from the positioning arm 120.

The damping element 130 may be made from a variety of energy-absorbing materials. In particular, a resilient, energy-absorbing material may be used to aid the damping element 130 in retaining its shape. In some embodiments of the invention, a material for the damping element 130 may be chosen so that the damping element 130 absorbs a large amount of energy from the positioning arm 120, or, in other embodiments, the damping element 130 material may be chosen so that as much energy as possible is absorbed. One suitable material for the damping element 130 is an elastomeric or thermoplastic material, such as Isodamp® C-1002 manufactured by E-A-R Specialty Composites of Indianapolis, Ind. A wide variety of other suitable damping materials that absorb shock and vibration energy may also be used within the scope of the invention.

In the embodiments of FIGS. 5–8, the damping element 130 is cylindrically-shaped with a circular bore 132 (FIG. 5) extending generally along the cylinder's central axis. FIGS. 6 and 7 illustrate the disposition of the damping element 130 within the interface component 100. The positioning arm 120 may be disposed in the circular bore 132 of the damping element so that the first end 122 of the positioning arm 120 extends above the upper surface of the damping element 130. The damping element 130, therefore, surrounds a length 11 (FIG. 7) of the positioning arm 120. The first end 122 of the positioning arm, however, is not surrounded by the damping element 130.

The damping element 130 can be shaped in a variety of manners. The damping element 130 need not be cylindrical in shape, but can instead, for example, have an elliptical, rectangular, or square cross-section. In the embodiments of FIGS. 5–8, in which a support structure 140 is used, the damping element 130 fits within the support structure 140. The shape of the damping element 130, therefore, may correspond to the interior of the upper portion 144 of the support structure 140. In other words, if the interior of the upper portion 144 of the support structure 140 is cylindrically-shaped, the outer portion of the damping element 130 may also be cylindrically-shaped in order to match the shape of, and fit snugly within, the support structure 140. The length of the damping element 130 may vary in different embodiments. In some embodiments, the length of the damping element 130 may be the same as the entire length of the positioning arm 120 aside from the first end 122. In other embodiments, the length of the damping element 130 may be shorter, such that it corresponds to the length of the upper portion 144 of the support structure 140.

Referring to FIG. 7, the damping element 130 may have a flat lower surface to mate with surface 142 of the support structure 140. Alternatively, if the surface 142 of the support structure has another shape, the lower surface of the damping element 130 may be shaped to match this surface 142. In addition, the upper surface of the damping element 130 may be similarly shaped to match the lower lip 125 of the first end 122 of the positioning arm 120.

The damping element 130 may be prefabricated, cut, drilled, or machined in order to snugly contain the body of the positioning arm 120 that extends through a portion thereof. In addition, in the embodiments of FIGS. 5–8 in which the support structure 140 is used, the damping element 130 may be cast-in-place within the support structure 140 as a mold. Alternatively, the damping element 130 may be laminated directly onto the positioning arm 120. Any method can be used to affix the damping element 130 within the support structure 140, including, for example, the use of adhesives.

The interface component 100 can be attached to the arm 94 of the positioning component 92 in at least two ways. In a first method, the support structure 140 of the interface component 100 can be attached to the arm 94 of the positioning component 92. The shoulder region 147 formed by the difference in diameter between the base region 146 and the upper portion 144 of the support structure 140 may aid in forming a base for attachment of the support structure 140 to the arm 94 of the positioning component 92, as can be seen in FIG. 6a. The base region 146 of the support structure 140 may be affixed to the arm 94 of the positioning component 92 by, for example, welding, shrink-fitting, or the like. In this embodiment, the arm 94 of the positioning component 92 can be specially designed to receive the base region 146 of the support structure 140.

In a second method of attaching the interface component 100 to the arm 94 of the positioning component 92, the positioning arm 120 itself may be attached to the arm 94. In this embodiment, the support structure 140 may also be attached to the arm 94 of the positioning component 92, although it does not need to be attached. The second end 124 of the positioning arm 120 may be affixed to the arm 94 of the positioning component 92 by, for example, welding, shrink-fitting, press fitting, the use of adhesives, or the like.

FIG. 6a depicts use of the interface component 100 in a rotational positioning system 90 constructed according to the invention. In operation, as can best be seen in FIG. 6a, the first end 122 of the positioning arm 120 extends above the damping element 130. The first end 122 of the positioning arm 120, which contains the rigid contact surface 123, therefore provides a rigid, non-yielding interface to the support arm 33 of the positioned component 30.

As shown in FIG. 6a, the damping element 130 is connected in parallel with the positioning arm 120 between the positioning component 92 and the positioned component 30. In other words, the damping element 130 itself does not contain the load-bearing surface that drives the support arm 33 of the positioned component 30 when the interface component 100 is in use. Instead, as depicted in FIG. 6a, the rigid contact surface 123 of the positioning arm 120 extends beyond the length of the damping element 130 and forms the load-bearing surface that drives the support arm 33 of the positioned component. Throughout this specification, a connection in "parallel" will be used to refer to a connection in which the damping element 130 itself does not contain the load-bearing surface that drives the support arm 33 of the positioned component.

Figure 4:
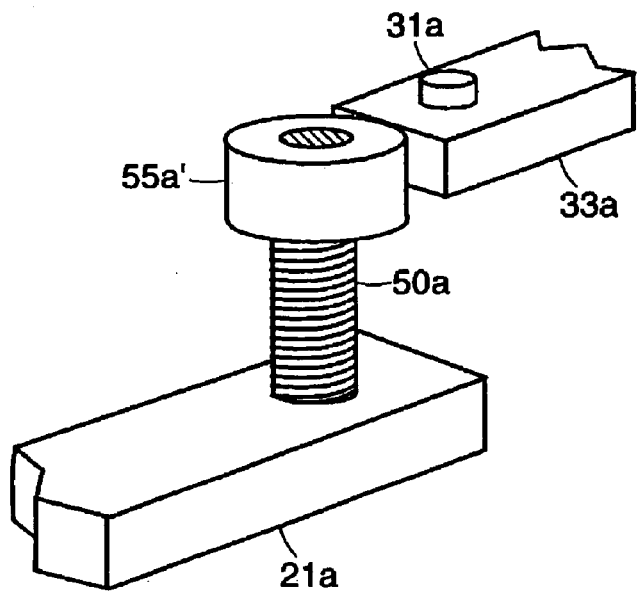
FIG. 4 is a diagram illustrating a prior art interface component for use in the linear positioning system of FIG. 1.

In operation, the interface component 100 of the invention provides damping for a positioning system 90 so that oscillation of the target feature 31 of a positioned component 30 after a change in position of the positioning component 92 may be damped out in a sufficiently short period of time. In addition, because the damping element 130 of the interface component 100 is not connected in series between the positioning component 92 and the positioned component 30 as in the prior art systems of FIGS. 2 and 4, changes in the properties of the damping element 130 with, e.g., time, temperature, and stroke range, may not adversely affect the performance of the positioning system.

The interface component 100 of the invention provides at least two performance advantages. First, the interface component 100 damps out oscillation of the target feature 31 of the positioned component 30 after a change in position of the positioning component 92. Second, the interface component 100 remains sufficiently stiff to function at high frequencies of operation. Because the damping element 130 is not connected in series in the positioning system, the effective spring constant of the interface component 100 is not greatly reduced by the damping element 130, and thus the interface component 100 is sufficiently stiff to operate at acceptably high frequencies without causing decoupling of the positioned component 30 from the input of the positioning component 92.

In operation, the support structure 140 of the interface component 100 generally acts as a mechanical ground for the damping element 130. The damping element 130 fits snugly around the positioning arm 120, and the damping element also fits snugly within the support structure. Vibration and shock energy from the positioning arm 120 is therefore translated to the damping element 130. Since damping element 130, in turn, fits snugly within the support structure 140, movement of the damping element 130 is restricted by the support structure 140. Vibrations or shocks to the positioning arm 120 are therefore damped out by the damping element 130.

Figure 3:
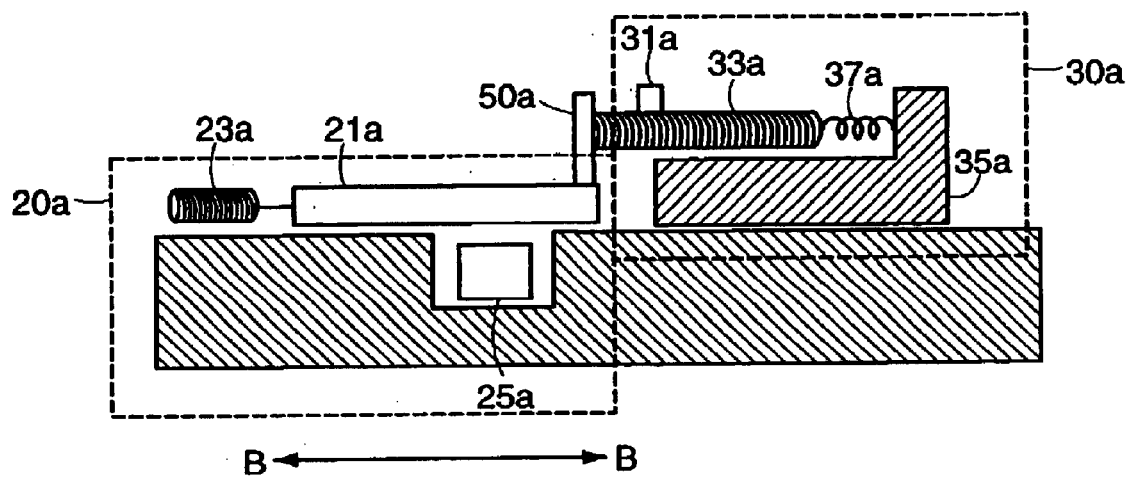
FIG. 3 is a diagram illustrating a prior art linear positioning system.
Figure 6B:
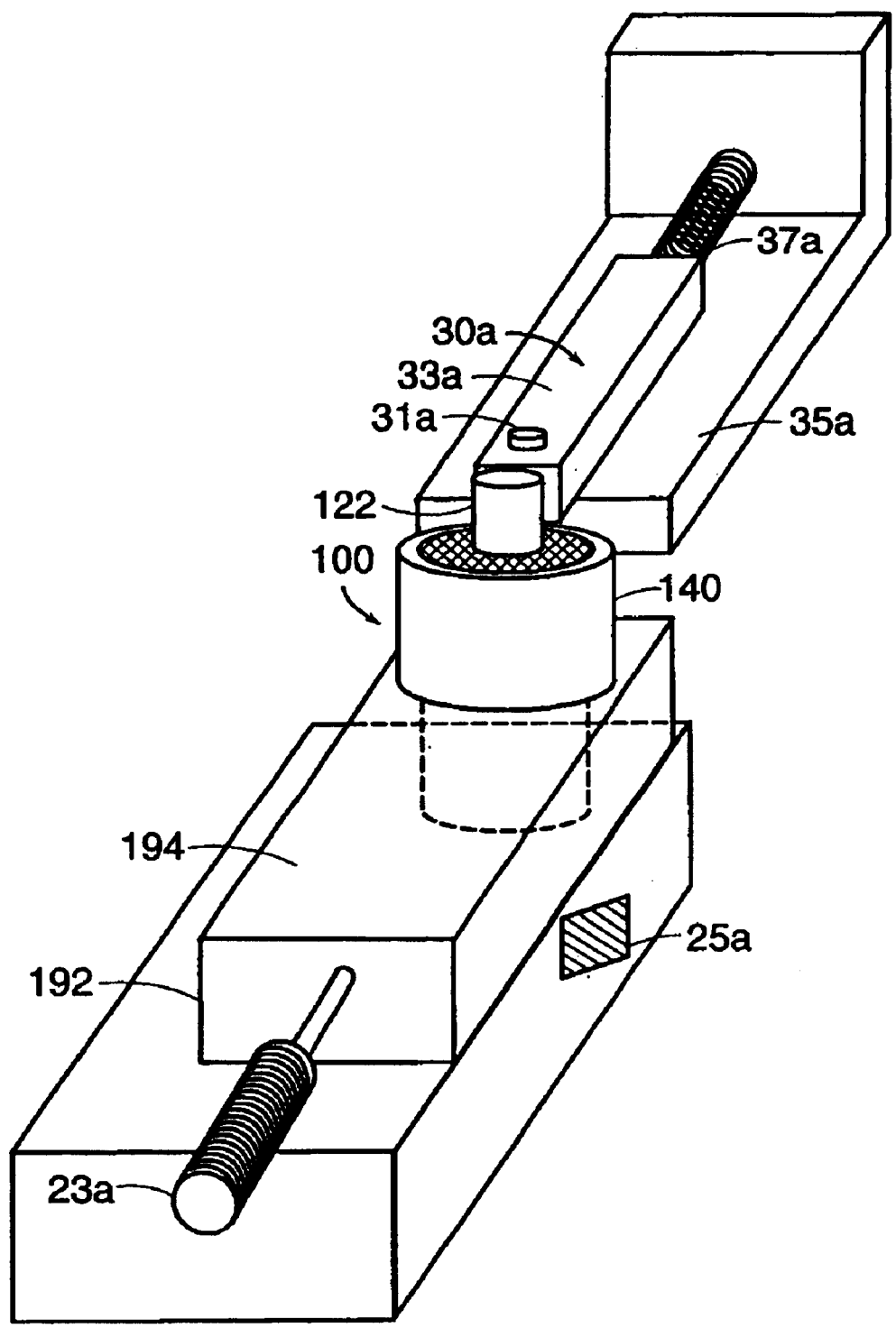
FIG. 6b shows a perspective view of the embodiment of the interface component of FIG. 5 in use in a linear positioning system.

FIG. 6b shows a linear positioning system 190 constructed according to an embodiment of the invention. As with prior art linear positioning system 10a (FIG. 3), system 190 includes a positioning component 192, which, in operation, controls the location of positioned component 30a. Generally, the positioning component 192 and the positioned component 30a may be the same as in the prior art linear positioning system 10a of FIG. 3. Positioning component 192, for example, includes a translationally mounted arm 194, an actuator 23a, and a position sensor 25a. Positioned component 30a includes an arm 33a, a bearing structure 35a, a biasing element 37a, and a target feature 31a. The linear positioning system 190 includes the improved interface component 100, which may be of the same construction as the interface component 100 used for the rotational positioning system 90 of FIG. 6a. The interface component 100 in the linear positioning system 190 may be attached to the arm 194 of the positioning component 192 in the same manner as for the rotational system 90 of FIG. 6a. The interface component 100 may function and provide the same advantages in the linear positioning system 190 of FIG. 6b as in the rotational positioning system 90 of FIG. 6a.

The embodiments of the interface component 100 described above may be used in a variety of positioning systems, including in a disk drive to locate a write head at the proper position during servo track writing. The use of the interface component 100 is, however, not limited to any particular type of positioning system, but instead may be used in differing types of systems, including in precision controlled positioning systems.

Figure 9:
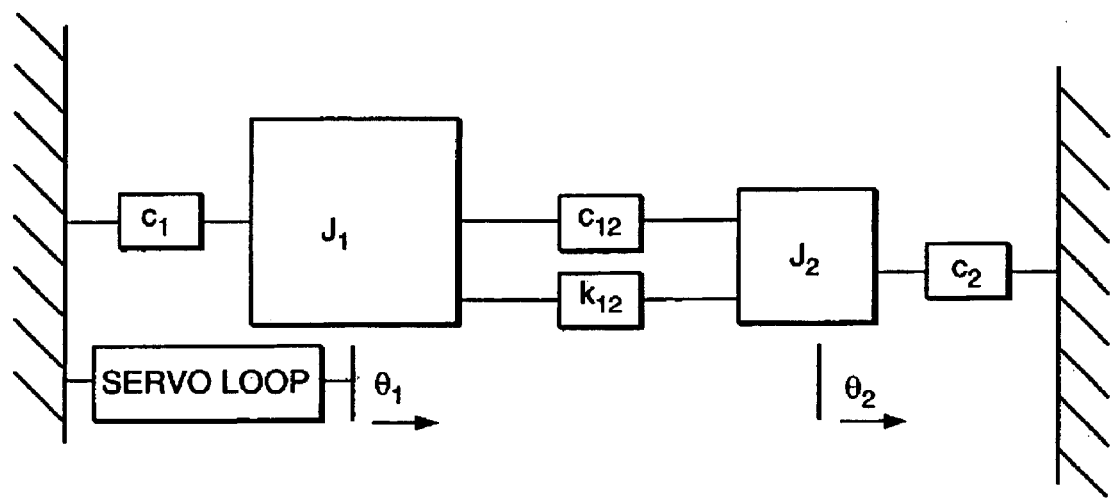
FIG. 9 is a block diagram illustrating a model for a mechanical positioning system.

FIG. 9 depicts a model that may be used for simulating the performance of a rotational positioning system. In FIG. 9, the inertia of the positioning component is represented by $J_1$, and the inertia of the positioned component is represented by $J_2$. The damping coefficient of the positioning component, which may be caused by friction or bearing forces, is represented by $C_1$, and the damping coefficient of the positioned component is represented by $C_2$. The damping coefficient of the interface component is represented by $C_{12}$. The effective interconnecting spring constant of the system as a whole (i.e., including the spring rate of the positioned component, positioning component, and the interface component) is represented by $K_{12}$. The angular position of the positioned component is represented by $\theta_2$, and the angular position of the positioning component is represented by $\theta_1$. Free body equations for the system of FIG. 9 are, with $\tau_{J1}$ being the torque at the mass having inertia $J_1$ and $\tau_{J2}$ being the torque at the mass having inertia $J_2$:

$$\Sigma \tau_{J1} \rightarrow \tau_1 + k_{12}(\theta_2 - \theta_1) + c_{12}(\dot{\theta}_2 - \dot{\theta}_1) - c_1 \dot{\theta}_1 = J_1 \ddot{\theta}_1$$

$$\Sigma \tau_{J2} \rightarrow -k_{12}(\theta_2 - \theta_1) - c_{12}(\dot{\theta}_2 - \dot{\theta}_1) - c_2 \dot{\theta}_2 = J_2 \ddot{\theta}_2$$

The constant values used in each set of the following experiments in FIGS. 10–15 were:
 $J_1$=0.006 in.-oz.-$s^2$
 $J_2$=0.0007 in.-oz.-$s^2$
 $C_1$=0.01 s/(in.-oz.)
 $C_2$=0.01 s/(in.-oz.)

Figure 10:
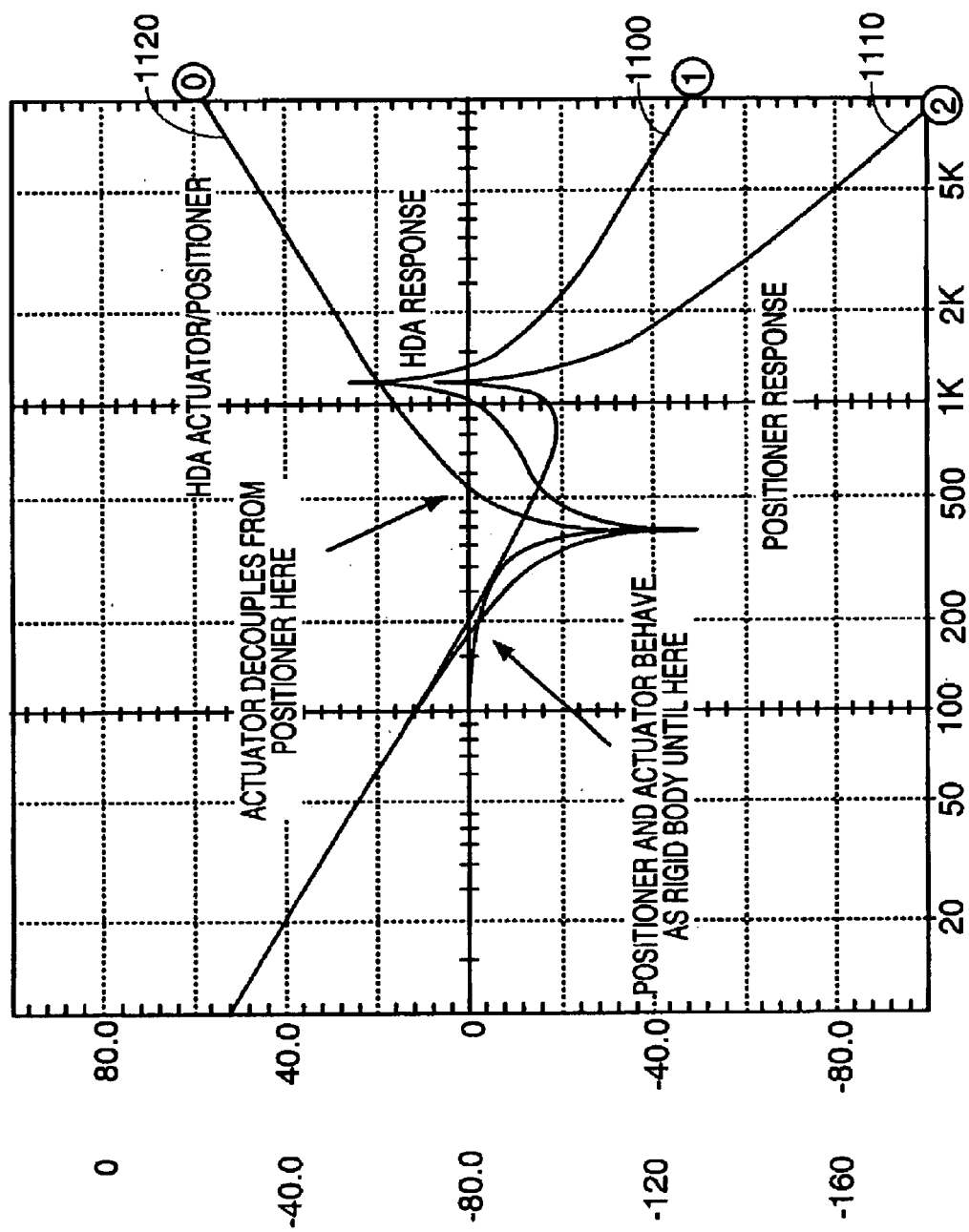
FIG. 10 is a bode response plot showing a positioning system response using a prior art interface component.
Figure 11:
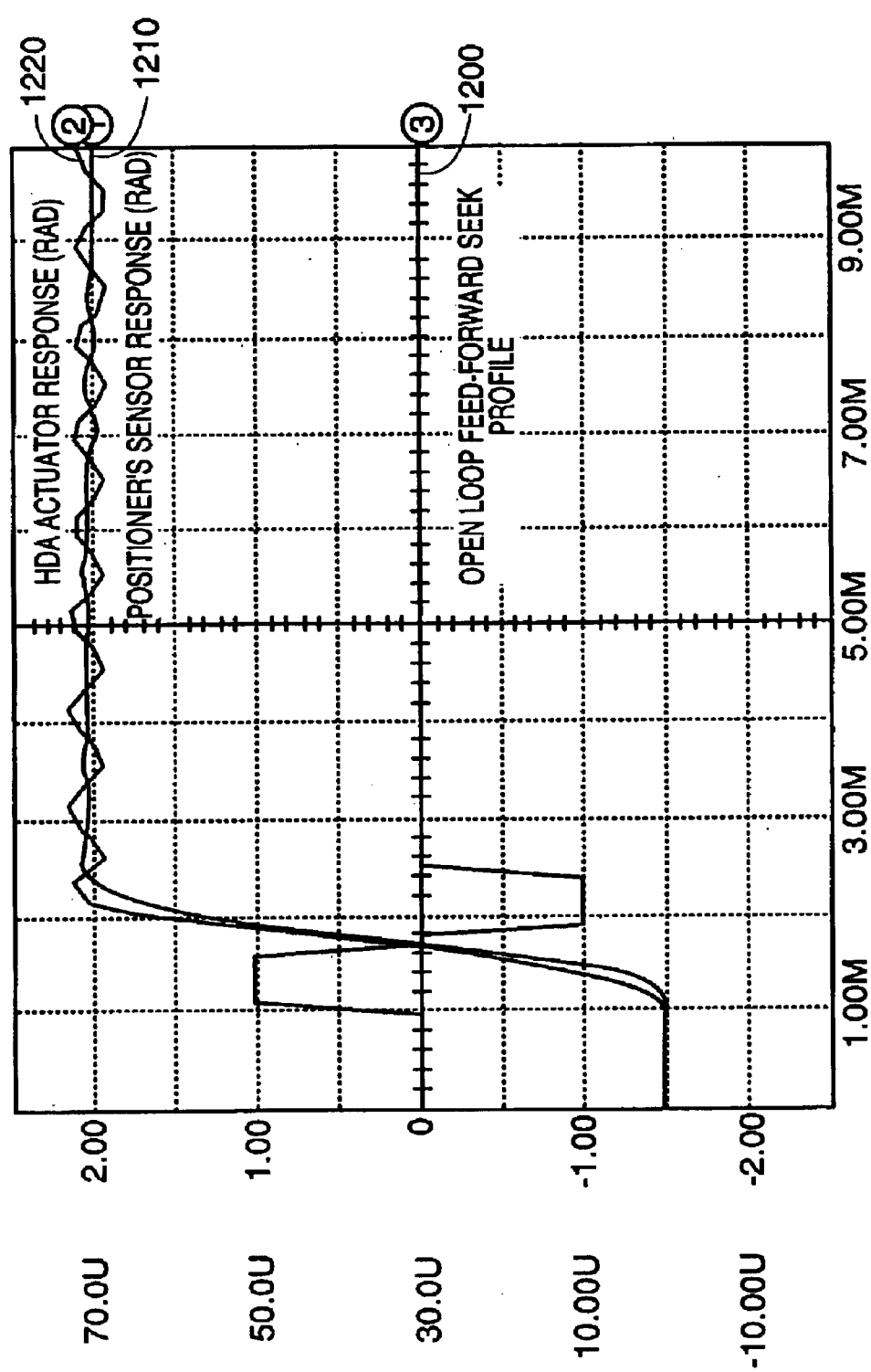
FIG. 11 is a plot showing the time response of the positioned component to a sudden change in the position of the positioning component using the prior art interface component of FIG. 10.
Figure 12:
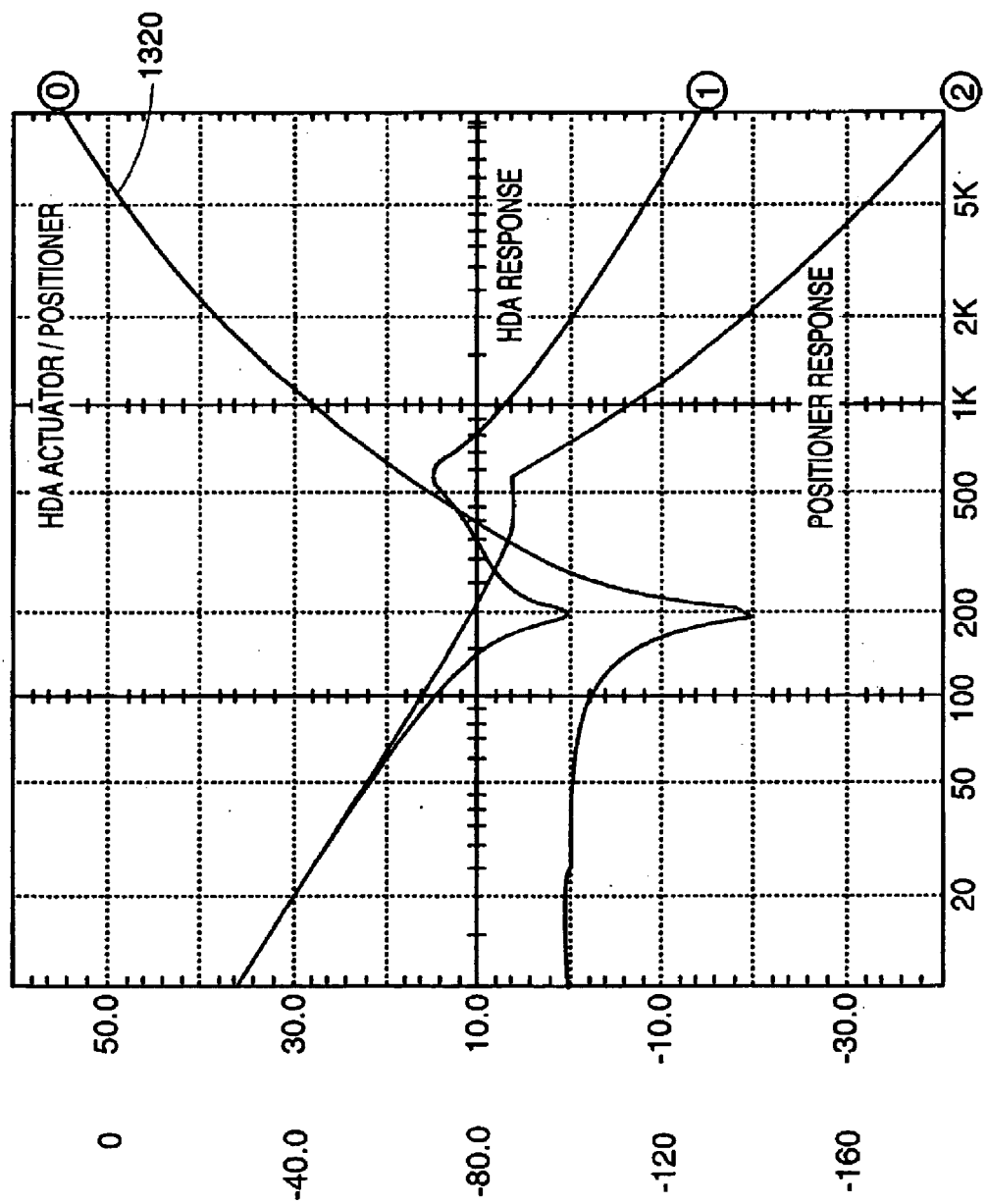
FIG. 12 is a bode response plot showing a positioning system response using a second prior art interface component.
Figure 13:
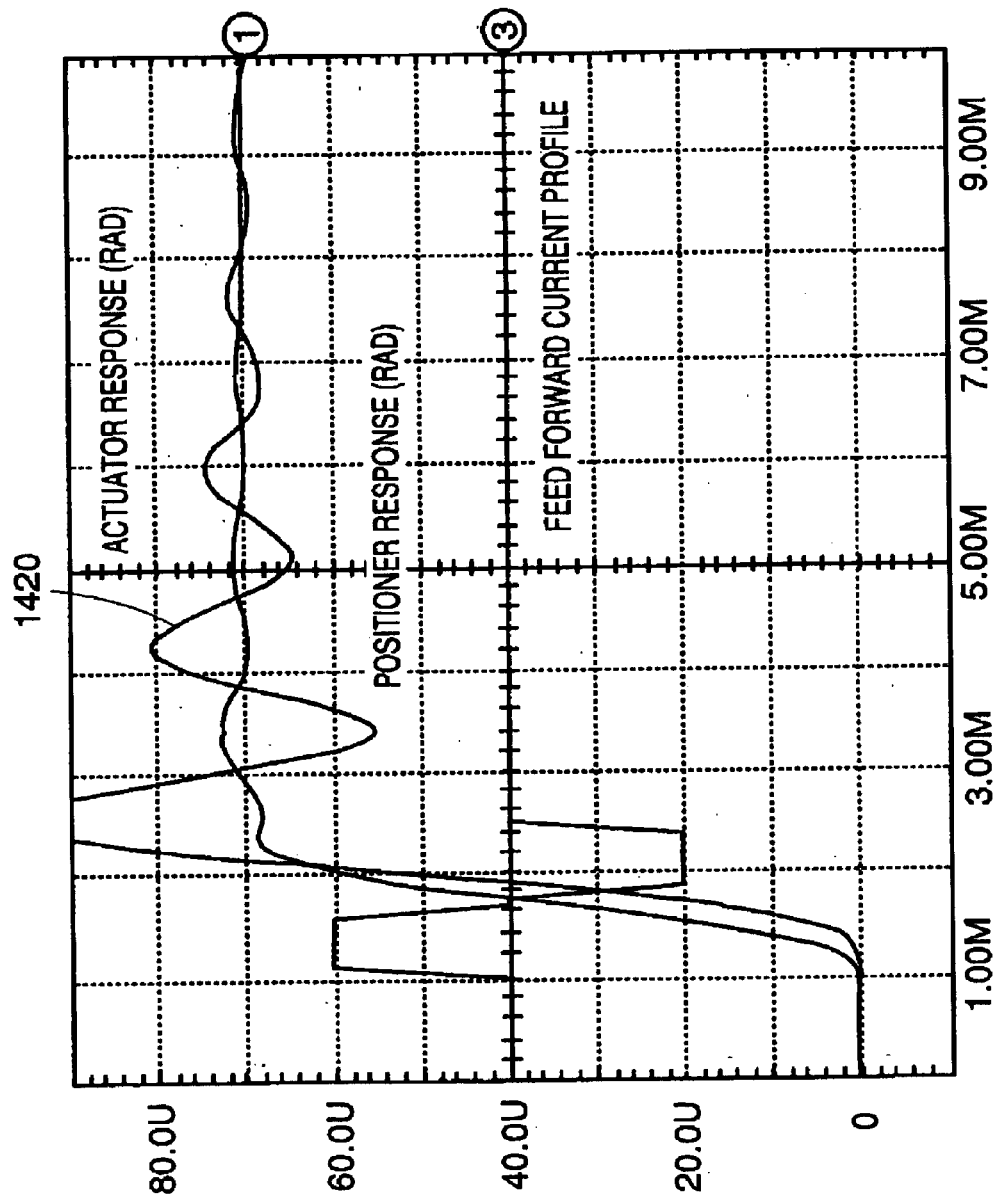
FIG. 13 is a plot showing the time response of the positioned component to a sudden change in the position of the positioning component using the prior art interface component of FIG. 12.
Figure 14:
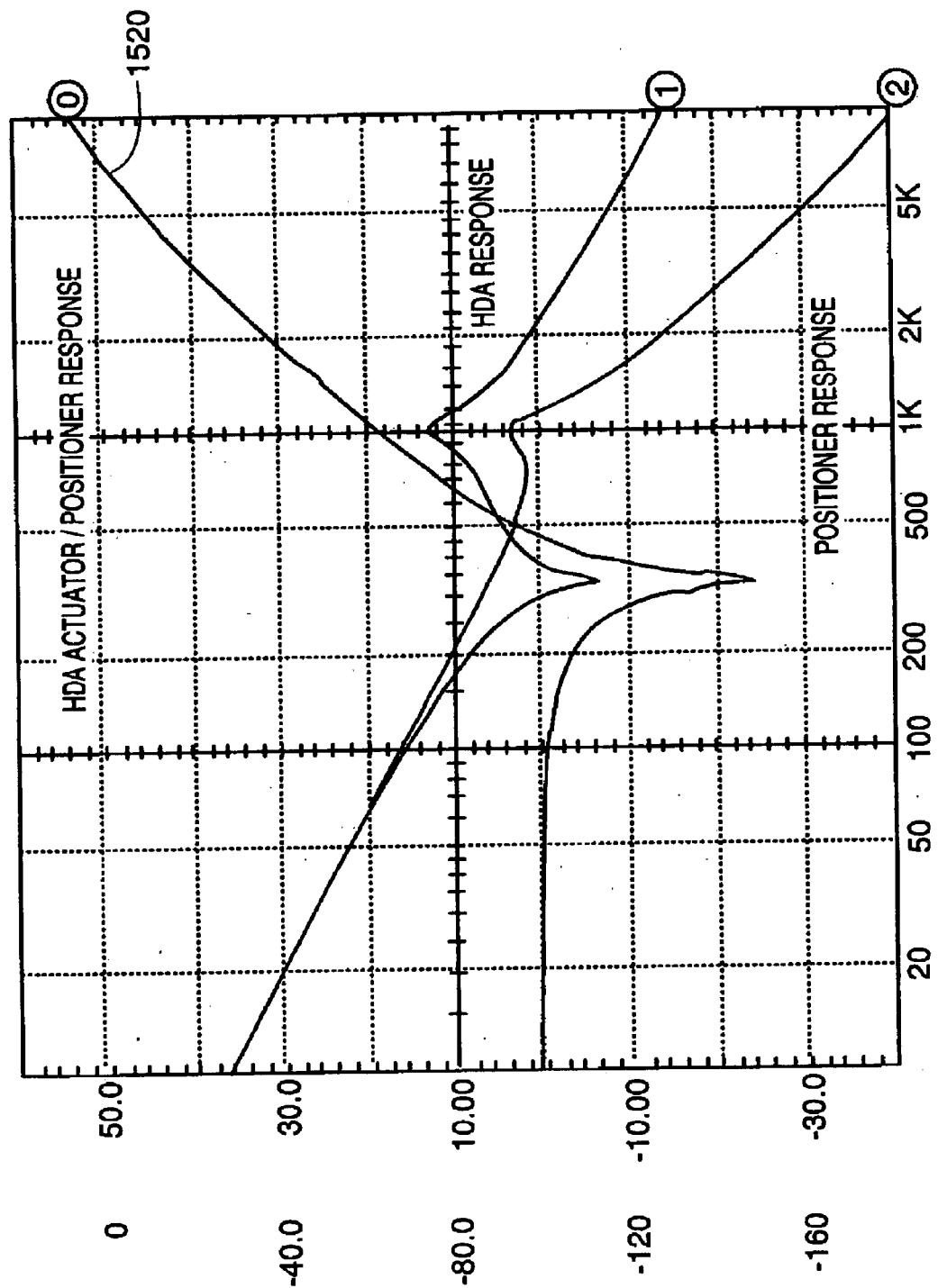
FIG. 14 is a bode response plot showing a positioning system response using the interface component of an embodiment of the invention.
Figure 15:
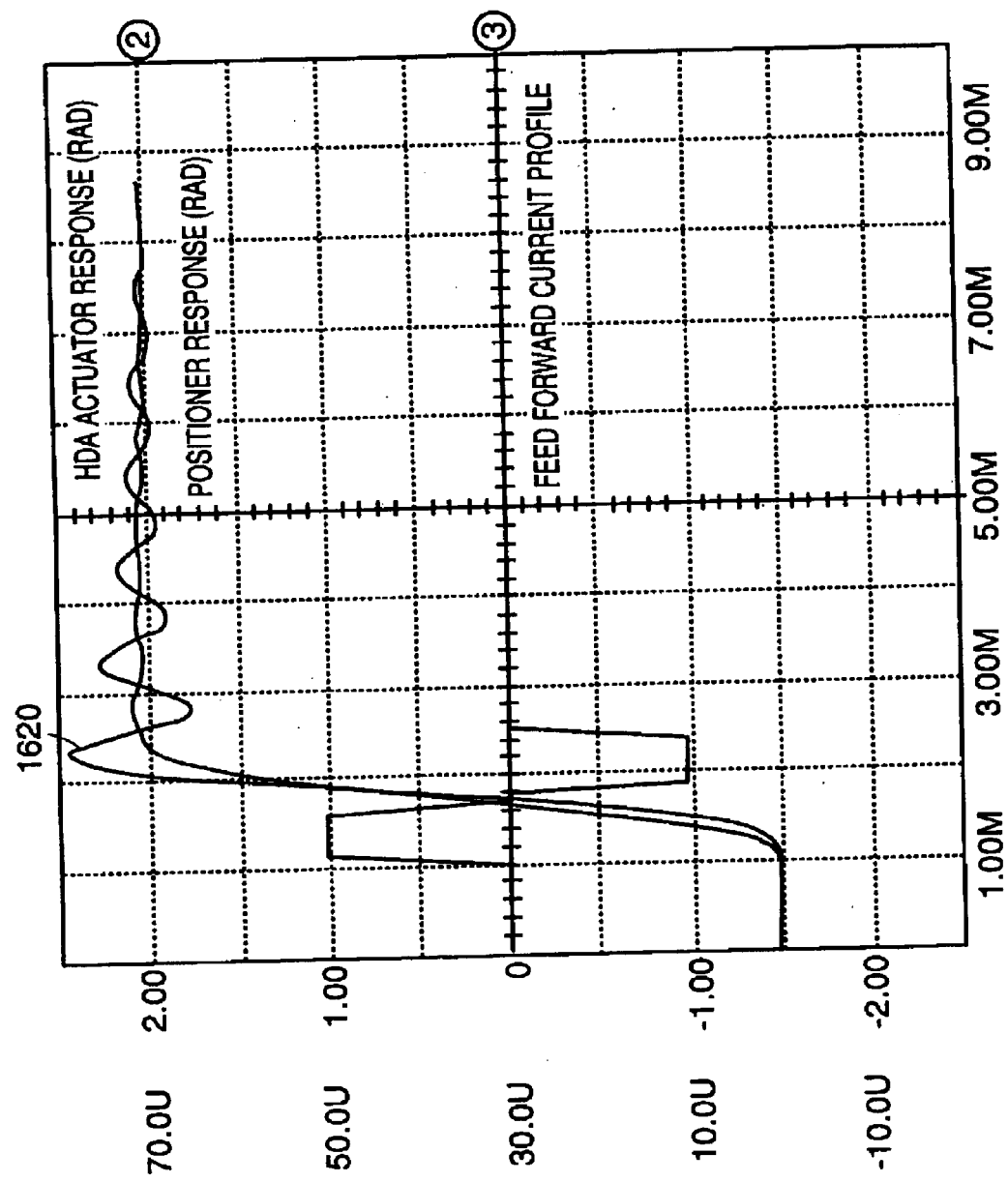
FIG. 15 is a plot showing the time response of the positioned component to a sudden change in the position of the positioning component using the interface component of FIG. 14.

FIGS. 10–15 depict responses of the model of the positioning system shown in FIG. 9 using three different interface components. FIGS. 10 and 11 depict the system response for a prior art positioning system using a stiff, rigid pin, such as the pin 50 of FIG. 1, as the interface between the positioning component and the positioned component. FIGS. 12 and 13 depict the system response for a prior art positioning system using a stiff, rigid pin surrounded by a damper connected in series, such as the system shown in FIG. 2. Finally, FIGS. 14 and 15 depict the system response of a positioning system that includes the interface component 100 of the embodiment of the invention of FIGS. 5–8.

The results shown in FIGS. 10–15 were produced using a commercial simulator, such as SPICE or Simulink. The results may vary depending on the mechanical properties of the components in a positioning system. The results, however, are generally illustrative of the improvement in positioning system response that may be achieved through the use of an interface component 100 of the invention.

FIGS. 10 and 11 show the model system response with the use of a stiff prior art interface component and no significant damping element. For these experiments, the values of $C_{12}$ and $K_{12}$ were:
 $C_{12}$=0.03 s/(in.-oz.)
 $K_{12}$=36,000 (in.-oz.)/rad.

FIG. 10 is a bode response plot showing the positioned component response 1100 compared to the positioning component measurement 1110 at various driving frequencies of operation. Curve 1120 shows the difference between the positioned component position and the positioning component input position (that is, curve 1120 corresponds to curve 1100 minus curve 1110). In this plot, the system behaves as a rigid body until about 200 Hz. In other words, at frequencies below 200 Hz, the positioned component response 1100 closely follows the positioning component input. At frequencies above 550 Hz, however, the positioned component response 1100 is decoupled from the positioning component measurement 1110, as indicated by curve 1120 at 550 Hz. In other words, the positioned component does not remain in contact with the positioning component 92 and, as a result, the location of the target feature 31 does not follow the positioning component.

FIG. 11 shows the time response of the positioned component to a single change in the position of the positioning component. In FIG. 11, curve 1200 represents a step input change the position of the positioning component, curve 1210 represents the position of the positioning component, and curve 1220 represents the position of the positioned component. The vertical axis represents position and the horizontal axis represents time. The positioned component response 1220 continues to oscillate around the positioning component position 1210 for an extended period of time—at least past 9 milliseconds as seen in FIG. 11. Thus, while FIGS. 10 and 11 show that a system with a stiff pin as a prior art interface component and little damping may not decouple until frequencies of around 550 Hz, the positioned component may oscillate about a desired position for an unacceptable period of time after a position change. Such oscillation may be unacceptable for positioning systems, including those used for servo track writing, because it may be important for the positioned component to settle in the desired position before an action, such as reading or writing, may be taken.

Figure 2:
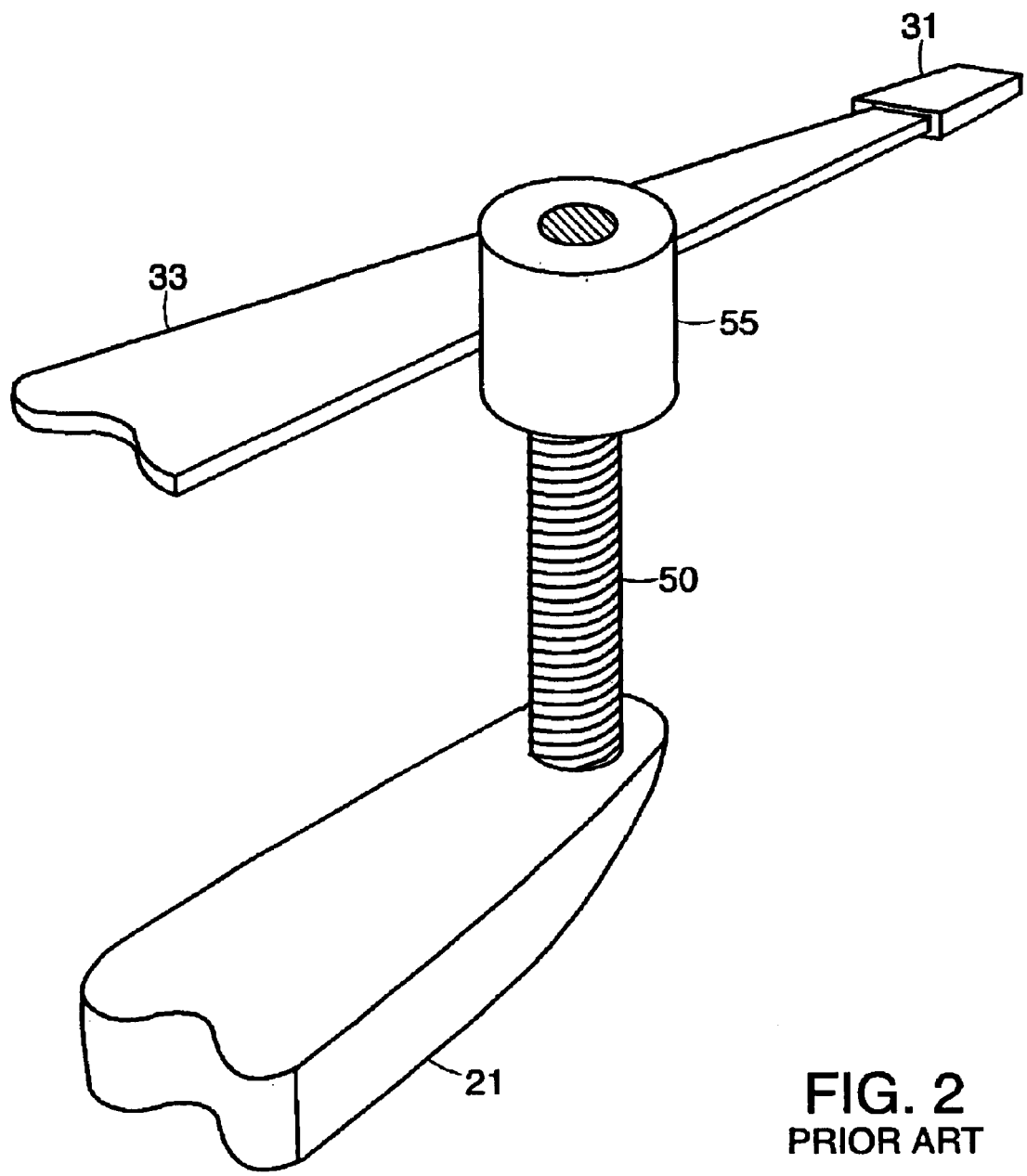
FIG. 2 is a diagram illustrating a prior art interface component for use in the rotational positioning system of FIG. 1.

FIGS. 12 and 13 show system responses for a model system using a stiff prior art interface component with a damping pad connected in series with the interface component, as is depicted in FIG. 2. Such a prior art interface component results in a decreased spring constant for the pin-pad combination and an increased damping coefficient. In the embodiment of FIGS. 12 and 13, for instance, the spring constant of the prior art interface component/damper combination is 25 percent of the stiffness of the prior art interface component used for the results of FIGS. 10 and 11. The damping coefficient of the prior art interface component and the spring constant used for the experiments of FIGS. 12 and 13 were:

$C_{12}$=0.7 s/(in.-oz.)
$K_{12}$=9,000 (in.-oz.)/rad.

FIG. 13 shows the system response with time for a sudden positioning component change in position. In FIG. 13, curve 1400 represents a step input change the position of the positioning component, curve 1410 represents the position of the positioning component, and curve 1420 represents the position of the positioned component. The positioned component response 1420 initially overshoots the desired position, but that the oscillation damps out more quickly than for the system shown in FIG. 11. The oscillation, for instance, is almost completely damped out by 9 milliseconds after the change in position.

FIG. 12 shows the system response at different operating frequencies for a model system using this prior art interface component. The bode response plot of FIG. 12 shows that the resonant frequency of the system is lower than for the system of FIG. 10. FIG. 12 shows that the positioned component response decouples from the positioning component input at frequencies above 275 Hz, as indicated by curve 1320 at 275 Hz. Although the damping pad serves to decrease the oscillation of the positioned component after a sudden positioning component change (see FIG. 13), the bode response plot shows that the system does not perform well at frequencies above 275 Hz. In addition to this problem, the properties of the damping pad change with time, temperature changes, and stroke range, which may make the location of the positioned component indeterminate as the properties of the damping pad change.

FIGS. 14 and 15 show the system response with the use of one embodiment of the interface component 100 of the invention. Since coupling the damping element 130 in parallel with the positioning arm 120, rather than in series as was done in the prior art, does not significantly decrease the spring constant of the interface component 100, the spring constant of the interface component 100 remains relatively high, resulting in a stiff interface component 100. For example, the spring constant for the interface component 100 used for the experiments of FIGS. 14 and 15 is roughly 75 percent of the stiffness of the prior art interface component used for the results of FIGS. 10 and 11. The damping coefficient of the interface component 100 and the spring constant used for the experiments of FIGS. 14 and 15 were:

$C_{12}$=0.7 s/(in.-oz.)
$K_{12}$=27,000 (in.-oz.)/rad.

FIG. 14, which shows a bode response plot for such a system, indicates that the positioned component position remains coupled to the positioning component input until a frequency of around 475 Hz, as indicated by curve 1520 of FIG. 14. In addition, FIG. 15 shows that the damping element 130 connected in parallel serves to quickly damp out the positioned component oscillation, as indicated by curve 1620. FIG. 15, for instance, shows that oscillation of the positioned component dies out within 9 milliseconds.

FIGS. 14 and 15 illustrate the improvements in system performance achieved using one embodiment of the interface component 100 of the invention. Connection of the damping element 130 to the positioning arm 120 in parallel improves the positioned component response to a sudden change in position of the positioning component (FIG. 15), while keeping the positioned component response coupled to the positioning component input until a frequency of operation of around 475 Hz (FIG. 14). Thus, the interface component 100 of the invention as used in the system of FIGS. 14 and 15 produces a modal frequency of operation that is almost as large as the stiff prior art interface component experiment of FIGS. 10 and 11, while damping out the positioning component oscillation more quickly.

The dimensions of the interface component 100 of the invention may be tailored in order to produce a desired spring rate, which may be determined in a method described in detail below.

For prior art interface components for positioning systems, the interface component would typically be made as stiff as would be feasible to produce. If the prior art interface component is used with a damping element connected in series, the spring constant of the prior art interface component as a whole would be significantly reduced by the damping element, thus making the stiffness properties of the pin portion of the prior art interface component less meaningful to the stiffness of the prior art interface component as a whole. If the prior art interface component is used without a damping element at all, the prior art interface component would typically be made as stiff as possible so that it would function at high operating frequencies, and oscillation of the system would be accepted as a hindrance to the system performance because a damping element is not used. With the use of a damping element connected in parallel as in various embodiments of the invention, however, the stiffness of the interface component 100 may be designed for given positioning systems to enhance system performance.

In order for the damping element 130 of the interface component 100 of the invention to damp out system energy effectively to reduce oscillation of the positioned component 30 about a desired position, a certain proportion of the energy in the spring system of the mechanical positioning system needs to be in the interface component 100 itself. If the stiffness (spring rate) of the positioning arm 120 is set too high, therefore, the energy in the spring system of the positioning system may reside in the positioned component or positioning component, and the damping element 130 may therefore be ineffective at damping out this energy to reduce oscillation. If, on the other hand, the spring rate of the interface component 100 is too small, the positioned component response will decouple from the positioning component input at an undesirably low frequency. For this reason, the interface component 100 stiffness may not, in some embodiments, be set as high as possible. Instead, as discussed below, the stiffness of the interface component 100 may be set at an appropriate level so that it will operate at a desired frequency of operation while still retaining spring energy of the positioning system so that oscillation may be damped out.

The spring constant of the interface component 100 of the invention is generally dominated by the properties of the positioning arm 120 and not by the damping element 130 or support structure 140. This is because, in operation, only the rigid contact surface 123 of the positioning arm 120 interfaces with the arm 33 of the positioned component 30. The properties of the positioning arm 120 may therefore be isolated in the design procedure to determine a spring constant $K_2$ for the interface component 100.

Further, in an embodiment in which the rigid contact surface 123 or first end 122 of the positioning arm 120 has a larger diameter or greater dimensions than the remaining length of the positioning arm 120 (each embodiment of FIGS. 5–8), the spring rate of the positioning arm 120 is dominated by the dimensions and properties of the length of the positioning arm 120 with the decreased diameter. For instance, the length 11 in FIG. 7 dominates the spring constant of the positioning arm 120 in that embodiment. The length 11 is the "free" portion of the positioning arm 120 upon which little or no force in the radial direction is exerted aside from the damping force of the damping element 130.

In the embodiment of the interface component 100 shown in FIGS. 5–8, the length $l_1$ (FIG. 7) is the length extending from the portion of the positioning arm 120 attached to the support structure 140 to the beginning of the first end 122. The spring rate or stiffness of the positioning arm 120 is dominated by the central body region 11, and not by the larger diameter portions of the positioning arm 120, such as the first end 122, or the portion of the positioning arm 120 affixed to the support structure 140 or the arm 94 of the positioning component 92. The dimensions (including the length and width or radius) of the positioning arm 120 over the length $l_1$ may therefore be modified to alter the spring rate of the positioning arm 120.

Figure 1:
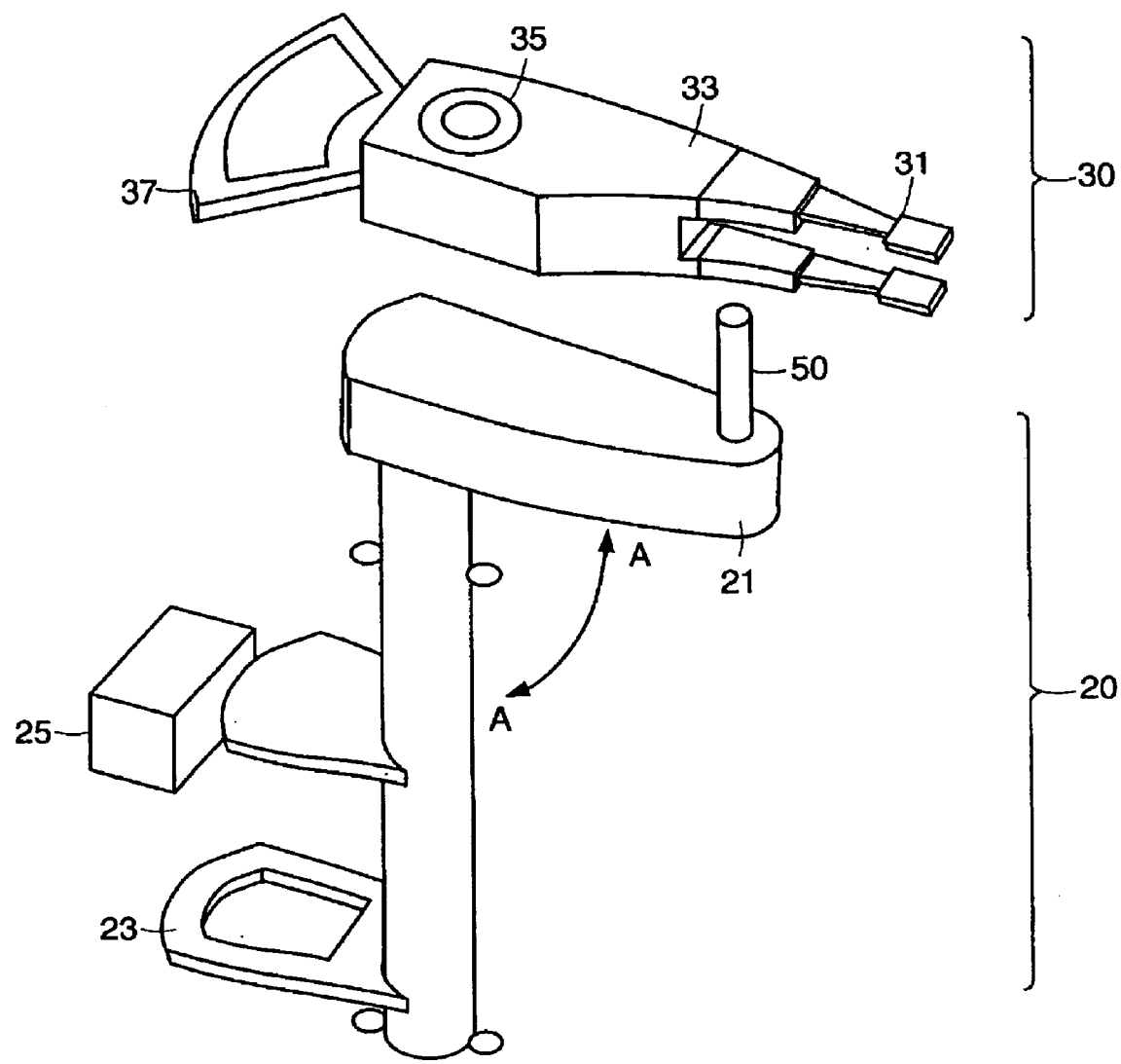
FIG. 1 is a diagram illustrating a prior art rotational positioning system.

FIG. 9, which was described above, depicts a system model that may be used to approximate the response of the positioned component in a rotational positioning system such as that of FIG. 1. In general, the effective interconnecting spring constant $K_{12}$ of the system is a function of (1) the effective spring constant $K_2$ of the interface component 100, and (2) the spring constant $K_1$ of the remainder of the system. The remainder of the system includes the positioned component and the positioning component. In some systems, the positioned component spring constant is significantly smaller than that of the positioning component, and in such cases the spring constant of the positioning component may be negligible (e.g., very stiff) and may therefore be ignored in calculating spring constant $K_1$. In other systems, similarly, the positioning component spring constant is significantly smaller than that of the positioned component, and in such cases the spring constant of the positioned component may be negligible (e.g., very stiff) and may therefore be ignored in calculating spring constant $K_1$. Because the weakest or least stiff spring in the system dominates the effective interconnecting spring constant $K_{12}$ of the system, there may be some limitations on how stiff the effective interconnecting spring constant $K_{12}$ may be set through alteration of the interface component 100.

Figure 16:
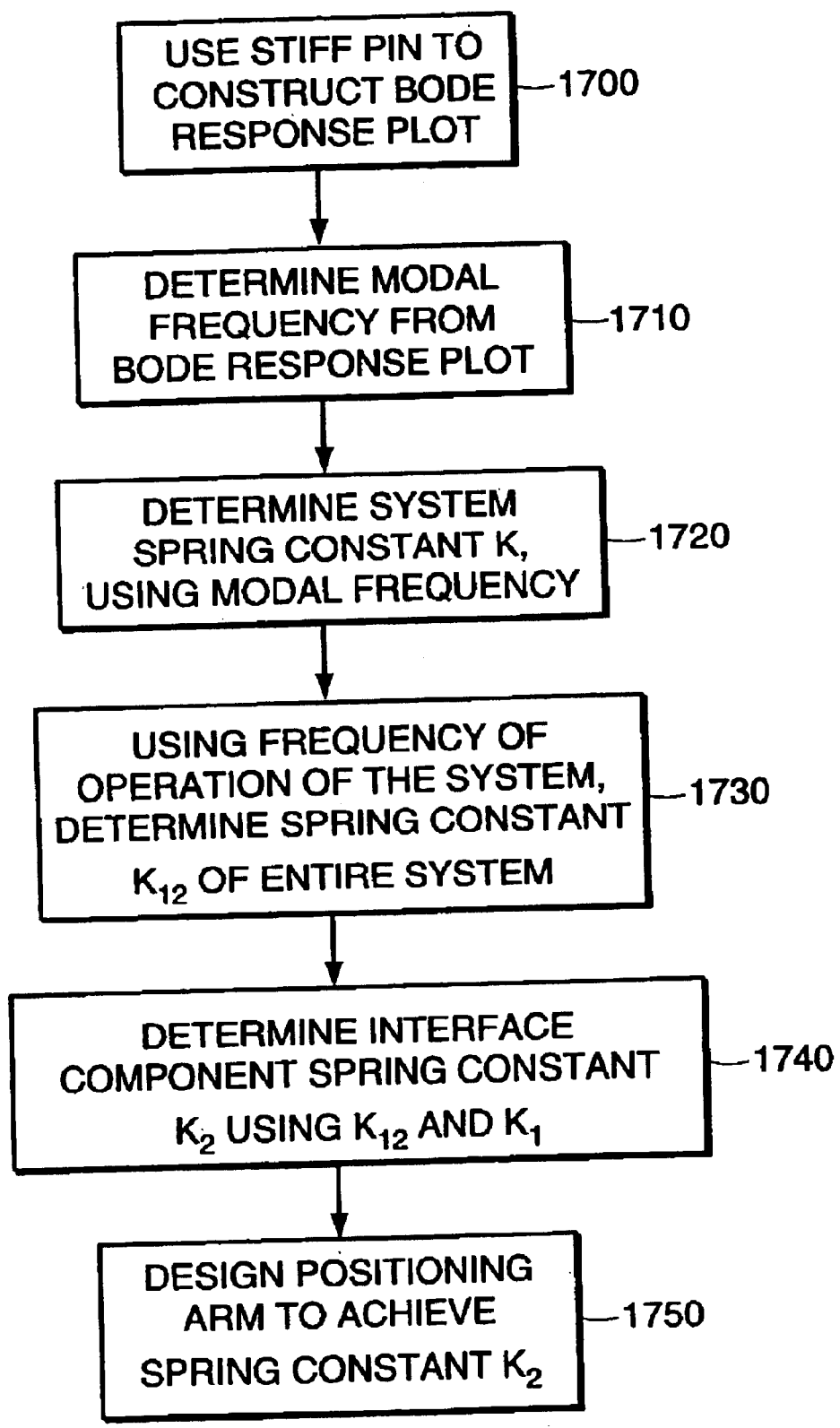
FIG. 16 is a flow diagram showing one design method of the interface component of the invention.

FIG. 16 is a block diagram that illustrates a design procedure for the interface component. The following method can be used to design the positioning arm 120 of the interface component 100 and the interface component 100 as a whole so that the interface component 100 has an appropriate spring constant for use in a given system.

Initially, the mechanical properties of the remainder of the system (that is, not including the interface component), and in particular spring constant $K_1$, can be determined. To determine the spring constant $K_1$ of the remainder of the system, the bode response of the system using a stiff pin (relative to the other system components) as the interface component can be constructed experimentally (block 1700 of FIG. 16). The use of a stiff pin minimizes the effect of the spring constant $K_2$ of the interface component on the system, thus allowing the spring constant $K_1$ of the remainder of the system to be determined independent of the interface component. For example, in the system model of FIG. 9, $K_{12}=1/((1/K_2)+(1/K_1))$. If $K_2$ is large in comparison to $K_1$, therefore, $K_2$ has a small effect on $K_{12}$, and $K_{12}=K_1$. Because use of a simulator to construct a bode response plot requires the value of the spring constant $K_{12}$, which is an unknown equaling $K_1$ in this part of the design procedure, the bode response plot for the system is constructed experimentally by actually measuring the performance of the system at different frequencies rather than using a simulator.

Using the bode response plot constructed experimentally using the stiff pin as the interface component, a resonant frequency of operation for the system can be determined graphically (block 1710 of FIG. 16). This resonant frequency can be, for instance, the maximum frequency on the bode response plot at which the positioned component response remains coupled to the positioning component response. If the bode response plot appears like the plot of FIG. 10, for instance, the resonant frequency would be approximately 550 Hz.

After the resonant frequency of operation is found using the bode response plot, the effective spring constant $K_1$ of the remainder of the system can be determined mathematically (block 1720 of FIG. 16), assuming, as stated above, that $K_{12}=K_1$ (because $K_2$ is large). As an example for the model of FIG. 9, the following equation for the natural resonant frequency can be used to determine the spring constant $K_1$: $w=\text{sqrt}(K_{12}/m_e)$, where w is the natural resonant frequency of the mass-spring-mass system (such as FIG. 9), $K_{12}$ is the effective spring rate of the system and equals $K_1$ in this step, and $m_e=1/((1/m_1)+(1/m_2))$, with ml being the mass of the positioning component and $m_2$ being the mass of the positioned component. As such, the spring constant $K_1$ of the remainder of the system can be determined.

The next part of the design procedure involves determining the desired spring constant $K_{12}$ for the system mathematically. For this part of the design procedure, the system uses the interface component 100 of the invention rather than a stiff pin as the interface component, as in the previous step. In addition, the actual spring constant $K_{12}$ of the entire system is determined, and not the spring constant $K_1$ of the remainder of the system as in the previous step. The effective interconnecting spring constant $K_{12}$ of the system (including the interface component 100) can be determined (block 1730 of FIG. 16) using a desired modal frequency at which the system should operate. The desired modal frequency of operation can be selected as the maximum frequency at which the positioned component should track the positioning component. This desired modal frequency is likely to differ from the natural resonant frequency for the system, although it could be the same. In one embodiment, the desired modal frequency could be the top operating frequency of the positioning system. For example, if the system should operate effectively at a maximum frequency of 700 Hz, 700 Hz can be set as the desired modal frequency. The equation w=sqrt($K_{12}/m_e$) for the mechanical model of the system can be used to determine the desired effective interconnecting spring constant $K_{12}$ of the system, where w is the desired modal frequency of operation and me is the same as in the previous step. By setting the desired modal frequency of operation at a realistically low level, and not at an unnecessarily large level, the interface component 100 can be designed to damp out oscillation in an improved manner.

To review the design procedure up until this point, the spring constant $K_1$ for the remainder of the system (excluding the interface component 100) can be determined. A desired modal frequency of operation may then be chosen for the particular application for which the interface component 100 will be used. Given this desired modal frequency of operation, the effective interconnecting spring constant $K_{12}$ desired for the entire system may be determined.

Given the effective interconnecting spring constant $K_{12}$ of the system as a whole and the effective spring constant $K_1$ of the positioned component and positioning component, the spring constant $K_2$ of a desired interface component 100 can be determined arithmetically (block 1740 of FIG. 16). In the embodiment of FIG. 9, for example, the following equation can be used to determine the spring constant $K_2$: $K_{12}=1/((1/K_2)+(1/K_1))$. After the spring constant $K_2$ of a desired interface component 100 is determined, the features of the positioning arm 120 may be designed to yield such the desired spring constant $K_2$ (block 1750 of FIG. 16). Such features may include the length and radius of the positioning arm 120, as well as the material used for the positioning arm 120. In designing the positioning component 120, the following equations can be used, which may be appropriate for the mechanical system of FIG. 9:

$K_{bending}=(3*E*G)/l^3$, where $K_{bending}$ is the bending spring rate of the positioning arm 120, E is the modulus of elasticity for the material used (an indication of stiffness of the material), l is the length of the "free" portion of the positioning arm 120, and $G=(\pi/4)*(R_{od}^4-R_{id}^4)$, with $R_{od}$ being the outside radius to the outer edge of the "free" portion of the positioning arm 120 and $R_{id}$ being the radius to an inner edge of the "free" portion of the positioning arm 120 if it is hollow.

$K_{torsion}=K_{bending}*r^2$, where $K_{torsion}$ is the torsional spring rate and r is the diameter of the cylinder.

After the spring constant $K_2$ has been selected and positioning arm 120 has been configured, a damping material may be selected that absorbs energy at the desired modal frequency, and the dimensions of the damping material that critically damp the interface component 100 may be determined. If the damping element 130 is connected in "parallel" with the positioning arm, as shown, for example, in FIGS. 6a and 6b, the damping element will not significantly affect the spring constant $K_2$ of the interface component 100. In some typical cases, it may be difficult to reach a critical damping level using the damping element 130. In such cases, a maximum practical volume of damping material may be used for the damping element 130.

After the dimensions of the interface component 100 have been determined and a prototype has been built, a bode response plot of the system using the designed interface component 100 may be constructed. Such a bode response plot may be used as a check to determine if the system is performing properly. If the system is not performing properly, the acts above may be repeated until a desired system response is achieved.

A single interface component 100 having a spring constant $K_2$ might not work well for every positioning system at a desired frequency of operation. For instance, if the inertia values $J_1$, $J_2$ of the positioned component and the positioning component vary, a different interface component 100 (having a different spring constant $K_2$) may be used to achieve the desired system performance. A single interface component 100 may only work well for a positioning system with a certain range of inertia values $J_1$, $J_2$ for the positioned and positioning components.

If a positioning system is configurable so that more than one positioned component or positioning component may be used with the given positioning system, a single interface component 100 could be designed to function at the extreme levels of the system. For instance, multiple positioned components may be used with a single positioning component. In this case, the positioned component inertia $J_2$ may vary. In addition, the operating frequency of the system may vary—the frequency of operation may be higher for the lower positioned component inertia $J_2$ system.

To design an interface component 100 for such a system where the positioning component varies, a maximum frequency of operation may be determined for the lower positioned component inertia $J_2$ system, and a separate maximum frequency of operation may be determined for the higher positioned component inertia $J_2$ system. The effective interconnecting spring constant $K_{12}$ of the system (including the interface component 100) may then be determined for each of these systems separately using the equation w=sqrt(K/$m_e$), where the frequency w and mass value me is different for each system. If the determined interconnecting spring constants $K_{12}$ of the two systems are sufficiently close, an average value may be used to determine the spring constant $K_2$ for the interface component 100 using the same method discussed above. Although this interface component 100 may not function ideally with both systems, it may perform adequately.

The accompanying Figures depict embodiments of the interface component 100 of the present invention, and features and components thereof. With regard to means for fastening, mounting, attaching or connecting components of the present invention to form the invention as a whole or a subcomponent of the invention as a whole, unless specifically described otherwise, such means are intended to encompass conventional fasteners such as machine screws, machine threads, seals, snap rings, clamps, rivets, nuts and bolts, toggles, pins and the like. Components may also be connected adhesively, by friction fitting, or by welding or deformation, if appropriate. Unless specifically otherwise disclosed or taught, materials for making components of the present invention may be selected from appropriate materials such as metal or metallic alloys, including steel and aluminum, ceramics, natural or synthetic materials, and plastics and the like, and appropriate manufacturing or production methods include casting, extruding, molding and machining.

Any references to front and back, right and left, top and bottom, upper and lower, and horizontal and vertical are intended for convenience of description, not to limit the present invention or its components to any one positional or spacial orientation. All dimensions of the components in the attached Figures may vary with a potential design and the intended use of an embodiment of the invention without departing from the scope of the invention.

While the present invention has been described with reference to several embodiments thereof, those skilled in the art will recognize various changes that may be made without departing from the spirit and scope of the claimed invention. Accordingly, the invention is not limited to what is shown in the drawings and described in the specification, but only as indicated in the appended claims.

What is claimed is:

1. An interface component for a positioning system, comprising:
    a positioning arm having a first end and a second end, the first end being positionable against an object to be positioned and the second end being attachable to an actuator arm of the positioning system; and
    a damping element operably connected in parallel with the positioning arm, the damping element being cylindrically shaped with a bore therethrough, wherein the positioning arm passes through the bore in the damping element.

2. The interface component of claim 1, wherein the first end of positioning arm includes a rigid contact surface, wherein the rigid contact surface may be positionable against the object to be positioned.

3. The interface component of claim 1, wherein the positioning arm extends at least partially through the damping element.

4. The interface component of claim 3, wherein the positioning arm is a cylindrical pin.

5. The interface component of claim 1, wherein a spring rate of the positioning arm is selectable by alteration of the radius of the pin.

6. The interface component of claim 5, wherein a spring rate of the positioning arm is selectable by alteration of the length of the pin.

7. The interface component of claim 3, wherein the damping element is laminated to the positioning arm.

8. The interface component of claim 1, wherein the damping element is made from an elastomeric material.

9. The interface component of claim 8, wherein the damping element is molded.

10. The interface component of claim 2, wherein the positioning arm and the rigid contact surface are made from-steel.

11. The interface component of claim 2, wherein the positioning arm and the rigid contact surface are made from a ceramic material.

12. The interface component of claim 2, wherein the positioning arm and the rigid contact surface are made from aluminum.

13. The interface component of claim 1, further comprising a support structure having a cup section and a base region with a bore therein, wherein the support structure is attachable to the actuator arm and the second end of the positioning arm is attached in the bore of the support structure, and wherein the damping element is mounted within the cup section of the support structure.

14. An interface component for a positioning system, comprising;
    a positioning arm having a first end and a second end, the first end having a rigid surface for contacting an object to be positioned and the second end being attachable to a positioning component of the positioning system; and
    a damping element having a bore, the positioning arm being operably connected to the damping element and extending through the bore, the first end of the positioning arm extending beyond the damping element, the damping element being operably connected in parallel with the positioning arm.

15. The interface component of claim 14, wherein the rigid surface and the positioning arm are of unitary construction.

16. The interface component of claim 14, further comprising a support structure having a cup section and a base region with a support bore therein, wherein the support structure is attachable to the positioning component and the second end of the positioning arm is attached in the support bore of the support structure, and wherein the damping element is mounted within the cup section of the support structure.

17. An interface component for a positioning system, comprising:
    a support structure having an end that is attachable to a positioning component of the positioning system;
    a positioning arm having a rigid surface at a first end for contacting an object to be positioned and a second end attached to the support structure; and
    a damping element operably connected in parallel with the positioning arm, wherein the damping element is mounted in the support structure, the damping element at least partially surrounding the positioning arm.

18. The interface component of claim 17, wherein the rigid surface is not: surrounded by the damping element.

* * * * *